US007631564B1

(12) United States Patent
Sihler et al.

(10) Patent No.: US 7,631,564 B1
(45) Date of Patent: Dec. 15, 2009

(54) DIRECT SHAFT POWER MEASUREMENTS FOR ROTATING MACHINERY

(75) Inventors: Christof Martin Sihler, Hallbergmoos (DE); Victor Donald Samper, Hallbergmoos (DE); Klaus Franz Otto Raum, Bavaria (DE); Simon Schramm, Munich (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/134,689

(22) Filed: Jun. 6, 2008

(51) Int. Cl.
 *G01L 3/10* (2006.01)
(52) U.S. Cl. .................................. 73/862.333
(58) Field of Classification Search .............. None
 See application file for complete search history.

(56) References Cited

U.S. PATENT DOCUMENTS

| 6,346,812 | B1 | 2/2002 | May et al. | |
|---|---|---|---|---|
| 6,581,480 | B1* | 6/2003 | May et al. | 73/862.333 |
| 6,776,057 | B1 | 8/2004 | May | |
| 6,810,754 | B2* | 11/2004 | May | 73/862.333 |
| 6,826,969 | B1 | 12/2004 | May | |
| 6,904,814 | B2 | 6/2005 | May | |
| 6,940,186 | B2 | 9/2005 | Weitkamp | |
| 6,959,612 | B2 | 11/2005 | May | |
| 6,975,196 | B1 | 12/2005 | Laidlaw | |
| 7,095,129 | B2 | 8/2006 | Moroz | |
| 7,117,752 | B2* | 10/2006 | May | 73/862.331 |
| 7,124,649 | B2 | 10/2006 | May | |
| 7,243,557 | B2 | 7/2007 | May | |
| 7,363,827 | B2* | 4/2008 | Hedayat et al. | 73/862.333 |
| 7,469,604 | B2* | 12/2008 | Hedayat et al. | 73/862.331 |
| 2006/0032319 | A1 | 2/2006 | Zielinski | |
| 2007/0247224 | A1* | 10/2007 | May | 330/63 |
| 2008/0204001 | A1* | 8/2008 | May | 324/207.2 |
| 2008/0257070 | A1* | 10/2008 | May | 73/862.333 |
| 2008/0313886 | A1* | 12/2008 | May | 29/607 |

(Continued)

FOREIGN PATENT DOCUMENTS

EP 1674724 6/2006

(Continued)

OTHER PUBLICATIONS

NCTE Engineering GmbH, "Torque Sensor Design & Dimension," http://www.ncte.de/ncte/cms/upload/downloads/english/D &D%20Torque.pdf, May 2006, pp. 1-8.

(Continued)

*Primary Examiner*—Lisa M Caputo
*Assistant Examiner*—Freddie Kirkland, III.
(74) *Attorney, Agent, or Firm*—Scott J. Asmus

(57) ABSTRACT

Direct shaft power measurements of rotating machinery, including a magnetic encoding system for the shaft, having at least one conducting member having a first end and a second end which is disposed proximate the shaft with a gap between the member and the shaft. There is a pair of electrodes proximate each end of said conducting member, wherein the electrodes are electrically coupled to the shaft. One of the electrodes is electrically coupled to the second end of the conductor member. An encoding source is electrically coupled to the first end of the conducting member and electrically coupled to the other electrode, wherein unipolar current pulses from said encoding source are applied to the electrodes and the conducting member, thereby creating sectional encoded polarized magnetic regions in the shaft.

16 Claims, 13 Drawing Sheets

U.S. PATENT DOCUMENTS

2008/0315870 A1* 12/2008 May .......................... 324/239
2008/0316669 A1* 12/2008 May .......................... 361/143
2009/0007697 A1* 1/2009 May ...................... 73/862.333
2009/0021244 A1* 1/2009 May .......................... 324/207.2
2009/0219122 A1* 9/2009 May .......................... 335/284

FOREIGN PATENT DOCUMENTS

| EP | 1744136 | 1/2007 |
| WO | 2006013089 | 2/2006 |
| WO | 2007006553 | 1/2007 |
| WO | 2007006555 | 1/2007 |
| WO | 2007068496 | 6/2007 |

OTHER PUBLICATIONS

Fraunhofer Institute "A Contactless Torque Sensor for Online Monitoring of Torsional Oscillations," 2007, pp. 1-4.

I. J. Garshelis, "A Torque Transducer Utilizing a Circularly Polarized Ring," IEEE Transactions on Magnetics, vol. 28, No. 5, Sep. 1992, pp. 2202-2204.

Magnetoelastic Devices, Inc., "The New Standard for Torque Sensing," M001-8076, Booklet pp. 1-17, 1998.

NCTE Engineering GmbH, "Bending Sensor Design & Dimension," http://www.ncte.de/ncte/cms/upload/downloads/english/D &D%20Bending.pdf, Aug. 2006, pp. 1-10.

Intellectual Property Office - United Kingdom, Search Report, Sep. 24, 2009, 3 pages.

* cited by examiner

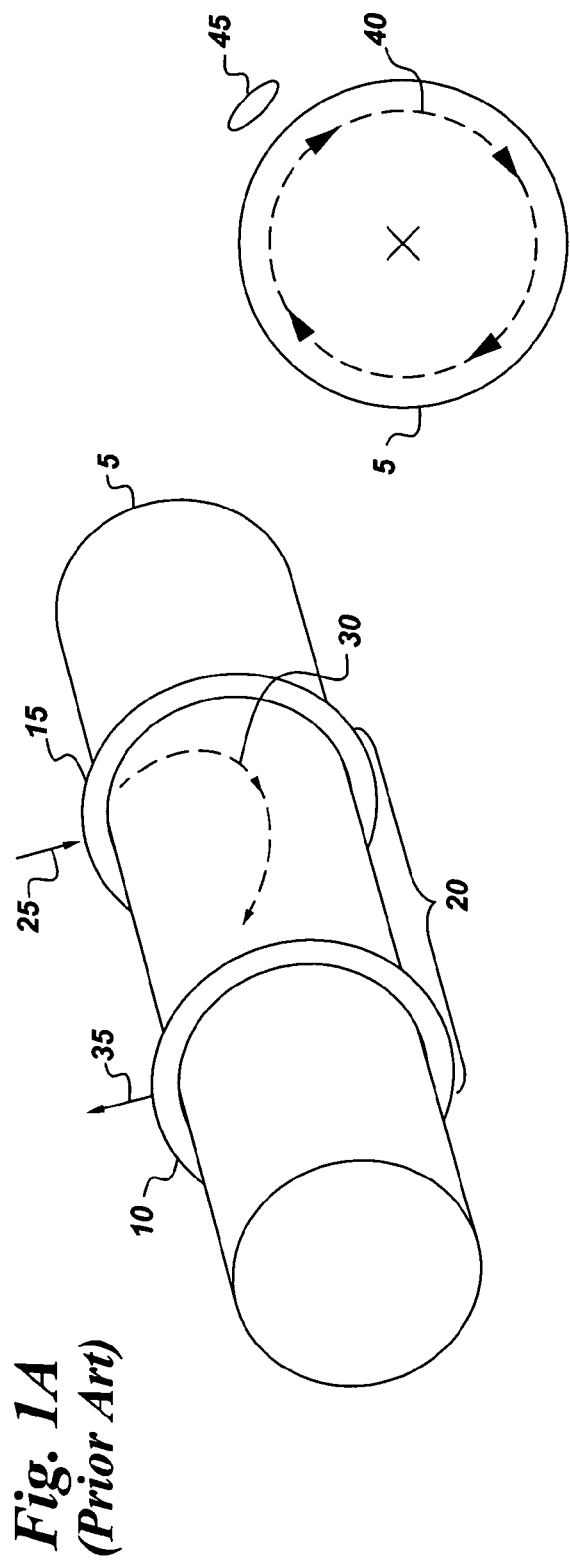
*Fig. 1A (Prior Art)*
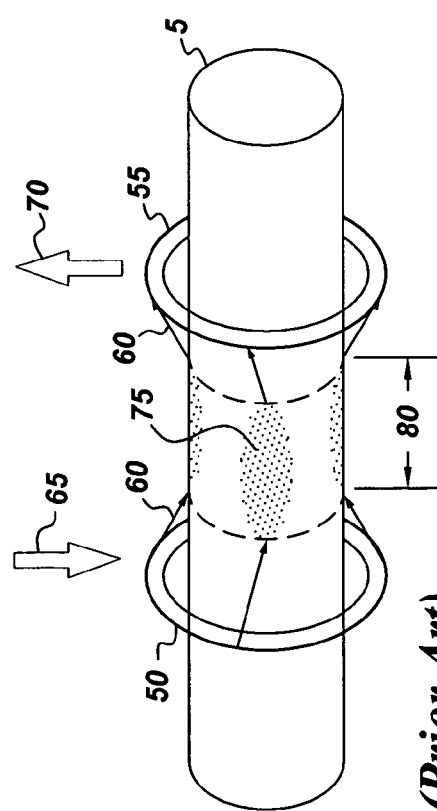
*Fig. 1B (Prior Art)*
*Fig. 1C (Prior Art)*

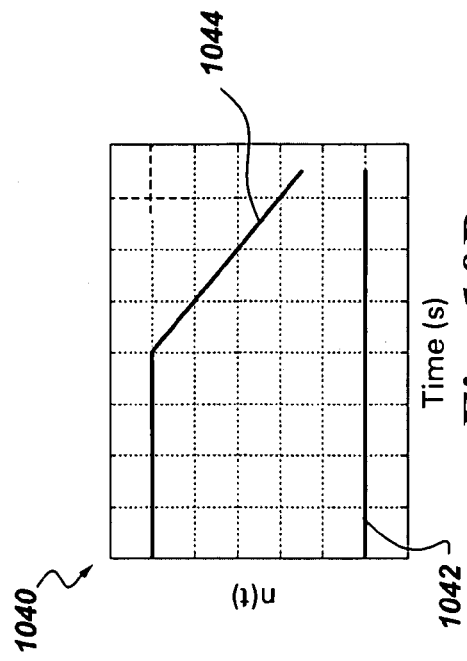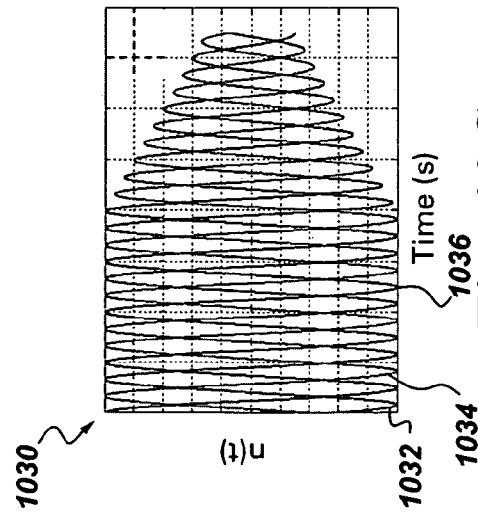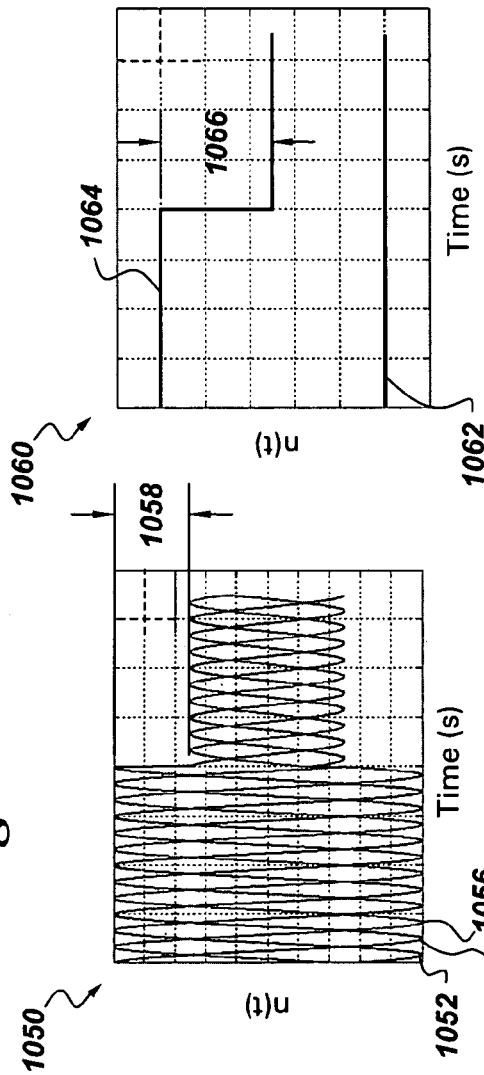

DIRECT SHAFT POWER MEASUREMENTS FOR ROTATING MACHINERY

BACKGROUND OF THE INVENTION

There are numerous applications and industries that are based on rotating shafts to accomplish some form of work or energy conversion. Early examples of rotating shaft functionality include the watermills and windmills thousands of years ago to grind grains. Rotating shafts are still used on current windmills and hydroelectric plants, however they incorporate advanced technology and processing. While small rotating shafts are used in electronic equipment such as computer disk drives, media recorders/players, and household appliances, these shafts are generally of a smaller length and width such that the torque is relatively small. Larger rotating shafts experience larger torque and are deployed in applications including locomotives, airplanes, ships, and energy conversion to name just a few examples. The modern usage of equipment utilizing larger rotating shafts typically incorporates sensing and processing capabilities to achieve safe and efficient operation.

One of the ways of addressing the design and operation of equipment using rotating shafts is via measuring the stress or strain at the shaft surface that can be used to measure torque, bending and twisting due to externally applied forces. Conventional technologies employ a number of different systems of sensing or measuring the torque such as strain gauge systems, encoder/tooth systems, acoustic wave systems, elastic systems, magnetostrictive systems, and magnetoelastic systems. Each of these systems has certain characteristics and applications.

Strain gauges provide for local strain measurements of the shaft and typically require some form of coupling to the rotating shaft that can be via a physical connection (e.g.: slip rings) or telemetry. The gauges generally suffer from low stability, have limitations in the bandwidth and tend to have calibration and environmental correction requirements. The limited operating temperature range of strain gauges limits their use in a harsh environment.

The encoder/tooth-wheel pickup style of torque sensing usually has at least some partial attachment to the rotating shaft such as by a magnetic tooth-wheel. The tooth-wheel design tends to be costly and impractical for many implementations. Such a design is not practical for higher speed applications and although stable, lacks high resolution and can cause reliability issues in harsh environment The acoustic wave systems utilize sensors such as surface acoustic wave (SAW) and bulk acoustic wave (BAW) devices that use acoustic waves to detect strain-induced changes to the shaft via telemetry with transducers connected on the shaft. The application of acoustic wave technology to torque sensing is relatively new and the present systems are being used for smaller shafts that have high manufacturing tolerances.

The elastic torque systems measure the twisting of the shaft by using markers across a length of the shaft and measuring the angular displacement. This system has accuracy issues when applied to large diameter shafts, and there are practical implementation problems.

In a magnetoelastic system, stress induces an 'easy axis' of magnetization through the strain it produces in the material. This effect is typically used in circularly magnetizing a shaft region, and using a magnetic field sensor to pick up the resulting field. If there is no torsional stress, all of the magnetic flux is contained within the sensing region and there is no external field detected. If there is torsional stress, the magnetic domains are re-aligned and the external field is changed with a polarity and strength that corresponds to the direction and magnitude of torque on the shaft.

Magnetostrictive measurement methods make use of the phenomenon that material changes dimensions upon being magnetized. Magnetostrictive sensors are used with ferromagnetic shafts, such as industrial steel, as well as sections of ferromagnetic material applied to the shafts. With such materials the magnetostrictive effect is very small. Typical magnetostrictive coefficients $\Delta l/l$ are in the order of 1 to $25 \times 10^{-6}$. Making direct use of the magnetostrictive effect for measuring torque in ferromagnetic material requires complex sensor arrangements, difficult calibration procedures and typically results in limited accuracy.

One conventional magnetostrictive torque sensor design employs a primary coil in the center of the measuring head and measurement coils disposed about the periphery in a specific orientation. The sensor generates a constant high frequency magnetic field via the primary coil wherein the resulting field is measured by measurement coils that measure the magnetic flux. When the resulting magnetic field from all the measurement coils is equal to zero, there is no torque on the shaft and likewise, any resulting magnetic field that is non-zero indicates some torque is present.

This approach does not require any encoding or other modifications to the shaft and does have long-term stability. However, the accuracy is limited, the installation process is cumbersome and calibration tends to be difficult. Furthermore, there are generally tight tolerance requirements for keeping a small gap between the shaft and the sensor that is difficult to achieve with temperature varying environments. The accuracy of the measurements is acceptable in certain requirements such as monitoring dynamic torque components and torsional vibrations however subsequent signal processing is required to minimize shaft run-out issues.

Improving the accuracy of magnetostrictive measurement systems can be achieved in combining the magnetostrictive effect with a magnetic encoding of the shaft or the encoding section applied to the shaft. In such sensor designs the alignment of the magnetic domains in the ferromagnetic material imparts some change of the material dimensions along the magnetic axis. The inverse effect is the change of magnetization of a ferromagnetic material due to mechanical stress. The magnetic encoding essentially turns the shaft into a component of the sensing system. When a mechanical torque is applied to the shaft, a torque-dependent magnetic field is measurable close to the encoded region of the shaft.

A typical magnetostrictive torque sensor design employs total shaft encoding and the magnetization occurs by current flowing in the axial direction of the shaft. For illustrative purposes, this conventionally uses current pulses to create a "magnetized ring" about the shaft. The encoding is circumferentially uniform as the magnetic encoding requires the entire cross-section to be magnetized and therefore becomes difficult and costly for larger diameter shafts. In addition, there are limitations to this approach with respect to variations of currents due to inhomogeneity of electrical and magnetic properties of the shaft. As torque is applied, a torque dependent magnetic field can be measured externally, such as by fluxgate sensors.

There are known implementations for magnetostrictive encoding which can be used, for example, in the automotive industry. The shaft is typically axially encoded along axial sections of the shaft establishing magnetically encoded regions. Magnetic field sensors are deployed externally to the magnetically encoded region, and the measured responses are subsequently processed for the torque. While there are a number of various other embodiments, the descriptions herein illustrate the basic operation.

Referring to FIG. 1a, a shaft 5 is composed of a ferromagnetic material. In order to encode the shaft 5, electrodes 10, 15 are disposed along the circumference of the shaft such that an encoded region 20 can be formed. In this example, the electrodes consist of a pair of outer rings 10, 15 and are spaced apart to provide satisfactory uniform magnetic flux density during encoding that depends upon several factors such as the shaft diameter.

The encoding process typically involves sending a current pulse 25 to a first ring 15 that establishes a current flow 30 along the longitudinal axis of the shaft 5 that is discharged at a corresponding second ring 10 with an output return current signal 35. The current 30 flowing in the encoded region 20 through the shaft 5 induces a magnetic flow. Various embodiments implement this basic concept including using multiple electrodes and with various encoding techniques.

In operation, a sensor is used to measure an output magnetic field signal that reflects the torque applied to the shaft. With no stress applied, there is no relevant magnetic field detected however as torque is applied to the shaft, the change in magnetic field emerging from the encoded region is measured by the sensor. The sensor is typically coupled to some processing electronics.

Referring to FIGS. 1a-1b, the current 30 flowing in the encoded region 20 through the shaft 5 creates a magnetic flow 40 that is a magnetic field at a center of the shaft 5.

One embodiment for illustrative purposes uses a single current pulse for creating a "magnetized ring" within the shaft such that there is an associated discharge curve reflecting the characteristics of the shaft at a particular instance of time. Alternatively, consecutive pulses with different polarities and different time constants can be utilized such that two magnetized rings can be encoded. There can be multiple encoding electrodes in addition to the encoding pulse.

This conventional system employs uniform encoding of the surface of the shaft and the magnetization occurs by current flowing in the axial direction of the shaft. The magnetic encoding is circumferentially uniform and requires the entire cross-section of the shaft to be magnetized. Such encoding makes it difficult to achieve a uniform current distribution in circumferential direction, especially with large diameter shafts.

With no stress applied, there is essentially no magnetic field detected however as torque is applied to the shaft the magnetic field emitted by the encoded region is measured by the sensor 45. In operation, as torque is applied, the magnetic field is measured externally, such as by sensor coils 45. The sensor 45 is typically coupled to some processing electronics (not shown) and is typically used to measure the output magnetic field signal that reflects the torque applied to the shaft 5. An example of a sensor 45 for torque sensing is a fluxgate sensor that is installed close to the shaft surface.

The conventional magnetic shaft encoding described herein generally applies to small diameter shafts with an encoding that is based on a uniform (constant) flux density in the circumferential direction. It is not practical for larger shafts as the encoding currents increase with the shaft diameter and large amperage would be required in order to get sufficient flux densities in the large diameter shafts.

In order to attempt to alleviate these large diameter shaft concerns, one conventional method uses multi-channel electrical connections as shown in FIG. 1c. In this example, a pair of rings 50, 55 are disposed proximate the shaft 5 with multiple electrical connections 60 electrically coupling to the shaft 5 such that the input current signals 65 travel along a magnetic encoding section length 80 of the shaft 5 with the return output signal 70 such that the encoding defines a magnetized region 75 in the shaft.

This complex encoding arrangement requires the spacing between the individual circumferentially placed current entry points be small in relation to the shaft diameter. Otherwise a sufficiently uniform magnetization in a circumferential direction is not achievable. Larger spacing requires the section length 80 be larger which causes implementation problems in many applications. In addition, the individual currents applied to the electrical connections must be controlled to all have the same amplitudes which becomes costly for larger diameter shafts.

Referring to FIG. 1d and FIG. 1e, the conventional magnetoelastic sensing of torque 90 is illustrated in which there are polarized rings 92, 93 that are coupled about the shaft 94 such that the rings 92, 93 magnetically divide opposing polarization regions. In this example, a domain wall 98 separates the polarized rings 92, 93. A magnetic field sensor 95 is located proximate the rings 92, 93 and senses the magnetic flux density 96. The results from the sensor 95 are processed such that the stresses in the rings 92, 93 correspond to torque imparted upon the shaft 94. Typically the results are transmitted to a computing device 99 such as a computer for the post processing. Once again, applying this type of sensing it typically inefficient for large diameter shafts.

The conventional sensing systems such as shown in FIGS. 1a-e generally operate on the principles referred to as the inverse Joule effect, the Matteucci effect, the Wertheim effect, the Villari effect and the inverse Wiedemann effect such as detailed in "*A Study of the Inverse Wiedemann Effect on Circular Remanence*" by I. J. Garshelis and J. Ivan, IEEE Transactions on Magnetics, Vol. 10, No. 2, June 1974. These effects are related to magnetostriction that explains changes in volume of magnetized material when torque is applied, thus explaining the connection between mechanics and magnetics.

Various processes and systems have been used to provide accurate and reliable measuring capabilities for rotating shaft, however continued improvements are needed especially with respect to larger diameter shafts and enhancements in operational efficiency.

SUMMARY OF THE INVENTION

The system and methods described herein relate generally to encoding and measurement methods and systems, and more particularly to measurement of torque, power, and bending moment in a ferromagnetic shaft with magnetized shaft sections.

One embodiment is a magnetic encoding system of a shaft, comprising at least one conducting member having a first end and a second end which is disposed proximate the shaft with a gap between the member and the shaft. There are a pair of electrodes proximate each end of the conducting member and electrically coupled to the shaft, wherein one of the electrodes is electrically coupled to the second end of the conductor member. An encoding source is electrically coupled to the first end of the conducting member and electrically coupled to the other electrode. The encoding source uses unipolar current pulses that are applied to the electrodes and the conducting member, thereby creating sectional encoded regions in the shaft.

The system in one example includes a non-conductive encoding assembly disposed about at least a section of the shaft, wherein the conducting member is disposed within the encoding assembly. The conducting member in one aspect includes orienting the conducting members axially, diagonally or circumferentially along at least a section of the shaft.

One further feature includes having the electrodes temporarily coupled to the shaft during the encoding and removed during rotating operations.

According to one embodiment, at least two of the conducting members are positioned adjacent to each other about the shaft with sectional encoded regions of opposing polarities. An additional feature includes domain boundaries formed between adjacent sectional encoded regions. In one example, the adjacent conducting members are positioned in close proximity to each other. According to one feature there are a plurality of conducting members oriented about at least a section of the shaft.

The shaft in one aspect is made of a ferromagnetic material, and in one example the ferromagnetic material is steel. According to another embodiment, the shaft has a layer of ferromagnetic material applied about a surface of the shaft.

The conducting members according to one aspect are substantially linear or circular and extend longitudinally or circumferentially along a section of the shaft.

One embodiment is a system for measuring properties of a rotating shaft, having a plurality of previously encoded magnetic sections disposed about the shaft, wherein adjacent magnetic sections have opposing polarities and domain boundaries between the adjacent magnetic sections. There is at least one sensor disposed proximate the encoded magnetic sections with a gap therebetween. A processing section is coupled to the sensor for processing an AC field component developed during rotation of the shaft thereby measuring properties of the rotating shaft based on a magnetostrictive effect.

The sensor in one aspect is at least one of an air core induction coil or a magnetic field sensor (MFS). The magnetic field sensors may include at least one of Hall Effect sensors, giant magneto-resistive (GMR) sensors, fluxgate sensors, or magnetoimpedance sensors.

One aspect of the properties include a non-contact measurement of at least one of shaft power, torque, speed or bending moments based on sensing magnetic field components in the shaft.

One embodiment is a method for encoding a shaft, including disposing at least one conducting member in close proximity about a section of the shaft, with the conducting member having a first end and a second end. This includes disposing electrodes to the shaft proximate the first end and the second end, wherein the second end electrode is coupled to the second end of the conducting member, electrically coupling the first end electrode to a current source and coupling the current source to the first end of the conducting member, and applying unipolar current pulses to the conducting members thereby creating sectional encoded regions.

According to one aspect, at least two of the conducting members are oriented adjacent to each other, wherein the encoding is with opposing polarities such that the resulting polarized magnetic channels have domain boundaries.

One technical effect of the present systems and methods is that the magnetic encoding essentially turns the shaft into a component of the sensing system such that as a mechanical torque is applied to the shaft, a torque-dependent magnetic flux component appears in the direct environment of the encoded region of the shaft.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIGS. 1a-c are prior art illustrations of magnetic encoding arrangements for shaft torque sensing.

FIG. 10a-f is another integral sensing system for sectional encoded shafts according to one embodiment.

DETAILED DESCRIPTION

Figure 1D:
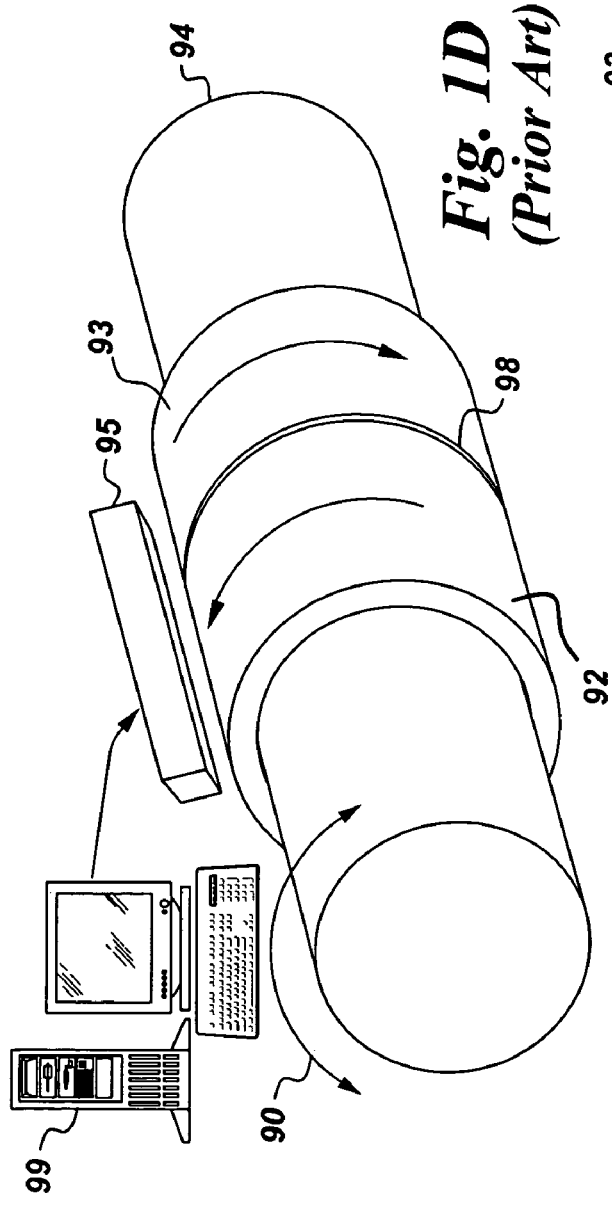
FIGS. 1d-e are prior art presentations of magnetoelastic encoded shafts.
Figure 1E:
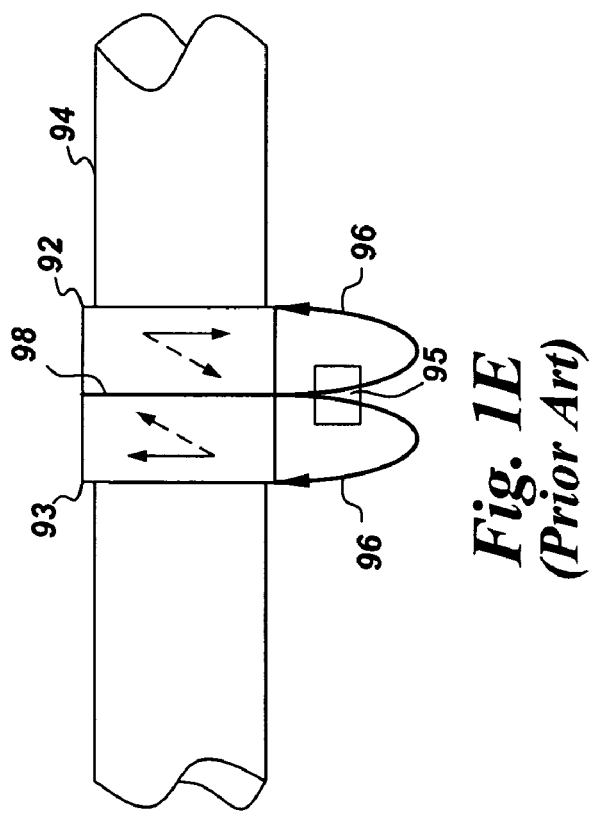

According to one embodiment, enhanced encoding systems for shafts and measuring properties thereof is achieved by sectional encoding where encoded zones or magnetic channels are generated in axial or circumferential directions of the shaft. For large diameter shafts, it is beneficial to employ this magnetic encoding where relevant flux densities can be achieved with lower encoding currents.

Referring to FIG. 2, encoding of magnetic polarized regions or channels according to one encoding embodiment is described. As previously noted, the shaft 205 can be a ferromagnetic material or have disposed upon it at least a section of ferromagnetic material affixed to the shaft. The encoding can be accomplished in a number of manners and one manner of operation disposes conducting members 215, 217 such as cables or metallic bars that are arranged about the shaft 205. As depicted, the conducting members 215, 217 extend along the shaft 205 longitudinally, although they may also extend circumferentially or diagonally.

In more particular detail of this embodiment, an encoding structure 210 is disposed about at least a section of the shaft 205. The encoding structure 210 in this example is a unit that is coupled proximate the shaft during encoding such that the conducting members 215, 217 extend along at least a portion of the shaft 205. The conducting members 215, 217 in this embodiment are arranged such that there are positive encoding conducting members 215 and negative encoding conducting members 217. The frame 212 of the encoding structure 210 is typically a non-conductive material such that the conducting members 215, 217 are isolated.

The encoding can be done during manufacture of the shaft or post installation and is permanent when applied to the right type of material and created with high current densities. The encoding structure in this example is depicted as encircling the shaft 205 and may include additional frame elements (not shown) to maintain its orientation and position about the shaft. This may include frame supports (not shown) to ensure the conducting members 215, 217 are arranged properly and sufficient for the encoding operation.

While the depicted unit 210 goes around the shaft 205, there is no requirement for the unit to encircle the shaft with conducting members. In a further embodiment, the encoding structure 210 is located proximate to a portion of the shaft 205 and there can be multiple encoding structures arranged about the shaft such that each of the encoding structures generates the magnetic polarized regions.

The conducting members 215, 217 are disposed proximate the shaft 205 with a gap between the member 215, 217 and the exterior surface of the shaft 205. According to one example, the conducting member 215, 217 are reinforced isolated copper bars, although other suitable conductors are within the scope of the system. The conducting members 215, 217 can be bars with a shape that can be round, oval, square or rectangular, for example. The length can vary depending upon the design criteria. Longer conducting members 215, 217 can provide greater surface area for sensing. The diameter of the conducting members 215, 217 should have sufficient rigidity and provide for the required current pulses. In one example, the bars can be less than one inch or several inches long and have a diameter ranging from 1/16 inch to 1/2 inch.

The conducting members 215, 217 have a first end and a second end and for illustrative purposes the first end shall be coupled to the encoding source 250 and the second end shall be coupled to the shaft 205. In order to electrically couple the conducting members 215, 217 to the encoding source 250, electrical connections 240, 260, 280, 290 are provided at the first end of the conducting members 215, 217. There are first end electrodes 247 that are used to establish electrical connections from the shaft 205 to the encoding source 250. There are second end electrodes 242 that are used to establish electrical connections from the second end of the conducting members to the shaft 205. The first and second end electrodes 247, 242 refer to the electrical coupling to the shaft 205 and in one embodiment the first end electrodes 247 are conductive elements coupled about the non-conductive frame 212 that contact the shaft 205. The second end electrodes 242 in one embodiment refers to a conductive element that extends from the second end of the conducting members 215, 217 to the shaft 205. The electrodes can also be points of contact with jumpers or wires that connect to the shaft 205.

For the positive conducting members 215, the encoding source 250 positive terminal is coupled to the first end of the positive conducting members 215 along the positive electrical connector 240. The encoding source 250 negative terminal is coupled to the electrode 247 and the shaft via an electrical connector 260.

For the negative conducting members 217, the encoding source 250 negative terminal is coupled to the first end of the negative conducting member 217 along electrical connection 290. The encoding source 250 positive terminal is connected to the electrode 247 and the shaft via electrical connector 280.

In one embodiment, electrical signals 245 travel through the shaft 205 such that magnetized regions are generated on the shaft 205. One of the features of this encoding system is the ability to magnetically encode channels or magnetic polarization regions in the shaft. In particular, steel shafts have a high relative permeability and the electric currents that travel through the steel shaft create distinct encoded channels.

One example of the sectional magnetic encoding uses four conducting members uniformly distributed approximately ninety degrees apart. The positive polarity current pulse 240 is coupled to the conducting member 215 and the current pulse travels along the conducting member to an electrode 242 that contacts the shaft 205 about the second end. The current discharged by the electrode 242 travels back along the shaft 205 to the first end electrode 247 and the negative connection of the encoding source via the electrical connector 260. The current 245 flowing along the shaft 205 creates a polarized magnetic channel on the shaft. Each of the adjacent conducting members in the structure 210 would have alternating polarities and the pulse encoding may simultaneously encode the conducting members all at one time, grouped, or individually. For example, the first set of positive conducting members 215 can be encoded simultaneously followed by the negative set of conducting members 217.

The encoding source typically can generate unipolar current pulses from a few hundred A to a few kA with a pulse length typically 1-100 ms. One example of an encoding source is based on a capacitor bank or a power electronic device generating the desired unipolar current waveforms. Another example of an encoding source is a pulse generator. In one embodiment the current pulses are short and can be characterized by a high frequency content.

The conducting members in one example include rigid or semi-rigid bars that define a relatively straight path for the current flow in a longitudinal direction, circumferentially or diagonally along the shaft. According to one embodiment a cage assembly is utilized to position the conducting members about the shaft in a secure manner for the encoding process. In one embodiment, the cage with the conducting members is affixed about the shaft such that the shaft and the cage are in a fixed relationship to each other until encoding is completed.

The current penetration, namely the depth of the current density in the shaft, is controlled by the duration of the current pulse in one embodiment. The current pulses are unipolar in this example, and are positive current pulses without the negative half-wave, or without the positive half-wave if negative current pulses are applied. In one embodiment, the current pulses are generated by discharging a capacitor bank wherein the size of the discharge resistor determines the discharge time constant and therefore the depth of the current penetration. By way of illustration, the sectional encoding method in one example uses five consecutive 500A current pulses with a pulse length of about 5 ms each to generate permanent magnetic flux densities of about 5 Gauss used to encode an industrial steel shaft with a diameter of 60 mm.

According to a simple encoding approach, a magnetized section is encoded one circuit at a time. For example, a positive polarity current pulse can be applied to encode a first encoded section followed by another section magnetized by applying a second circuit with a negative polarity. Subsequent sections are encoded using alternating polarity current pulses.

Such a sequential encoding process with alternating polarity current pulses creates multiple almost identical encoded sections. If only one current pulse is applied to each section to be magnetized, the sections are generally not identical because magnetizing the second section also affects the first magnetized section. This undesired interaction is higher in the middle of the encoding tool than at the beginning and end of it, where the electrodes contact the shaft. Almost identical encoded sections can be achieved in performing sequential current pulses, alternating the sections while magnetizing and by performing the magnetic field measurements close to the regions where the electrodes contact the shaft. Another example for sequentially creating magnetized zones in the shaft measures the field strength created in each segment or zone and adapts the amplitude of the current pulses for the subsequent encoding steps.

To avoid that the influence of sequential magnetization of one section by the next magnetization, another encoding embodiment is to apply the same current amplitude to all the conducting members and encoding all the sections at once. In one embodiment, the conducting members would use separate or split encoding sources to accommodate the multiple conducting members. In one example, separate capacitor banks would be used for each conducting member.

For example, if there are four segments, one encoding source can be used to apply the same current pulses to each of the four current encoding sources with alternating polarities. In another example, there are four separate encoding sources thereby avoiding short circuits between the different encoding currents during the encoding process. In another example, a switching scheme can be employed to apply the current pulse signals with alternating polarities.

While the conventional techniques rely upon total circumferential shaft magnetization, one embodiment of the system herein encodes magnetic channels in the shaft using the return currents. The sectional magnetic encoding takes advantage of the asymmetrical skin effect and the fact that a current always takes the path of least impedance. The impedance is dominated by inductance if the frequency of the current is high enough. In the case of a short current pulse the return current flowing in the shaft will be more localized than in the case of a longer pulse, enabling polarized and well defined/narrow magnetic patterns. This effect is used to magnetize sections of a shaft with more localized channels that lead to faster changes in the magnetic field during sensing. Therefore the pulse length during encoding affects the signal frequencies observed during sensing application.

Figure 2A:
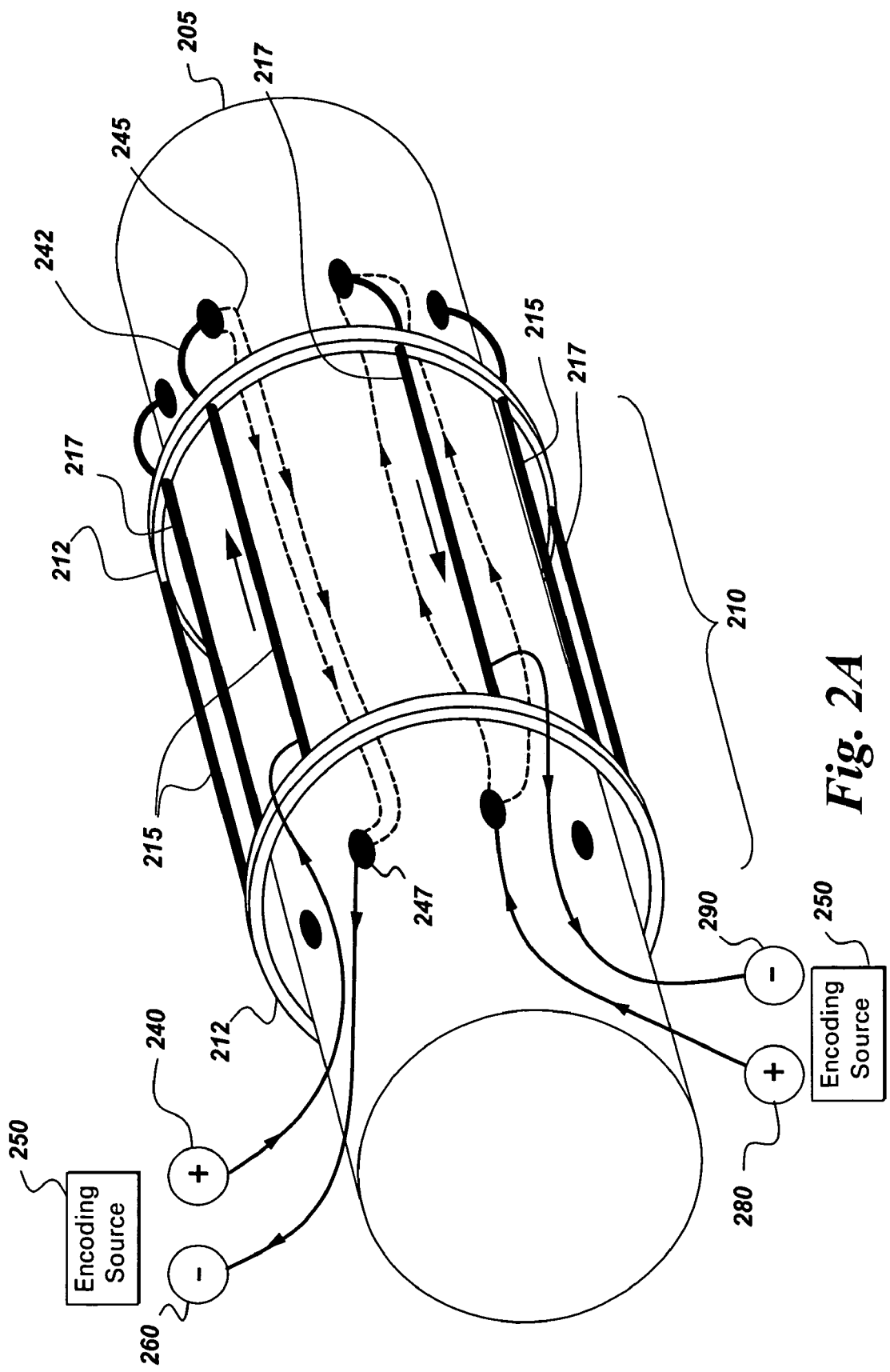
FIG. 2a is a basic depiction an encoding system configured in accordance with one embodiment.
Figure 2B:
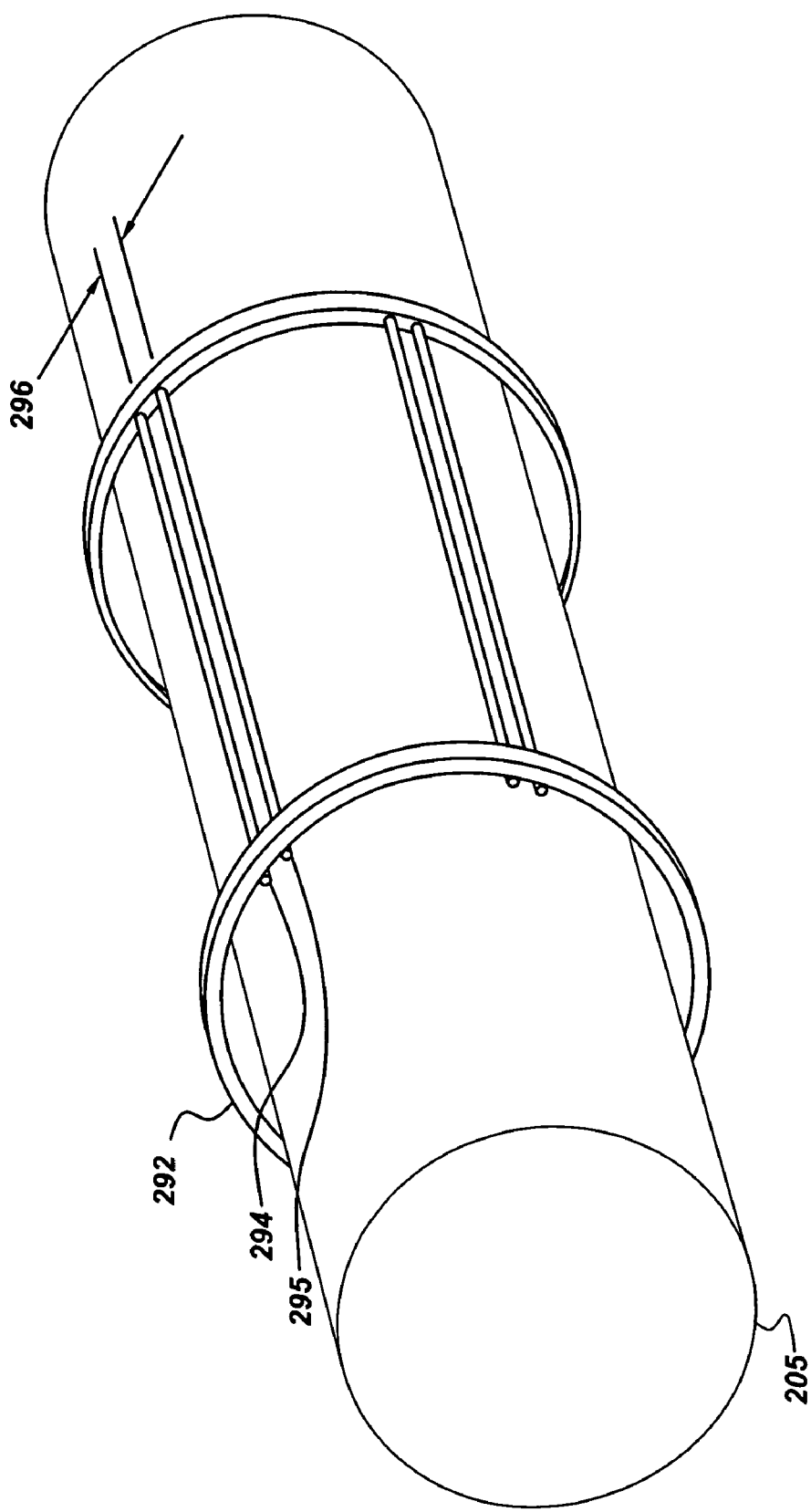
FIG. 2b is a basic depiction of an encoding system configured in accordance with another embodiment.

Referring to FIG. 2b, another encoding configuration is illustrated wherein there are paired conducting members 294, 295 proximate the shaft 205. In this embodiment, the paired conducting members 294, 295 are coupled about a non-conducting frame 292 wherein several paired conducting members can be positioned about the frame 292. The conducting members 294, 295 are located in proximity to each other approximately parallel and separated by a gap 296.

Similar to the description of FIG. 2a, the conducting members are coupled to an encoding source such that the members are coupled with opposing polarity. There are connections that electrically couple one end of the conducting member to the encoding source while the other end is electrically coupled to the shaft 205. The encoding is similar in functionality to that detailed for FIG. 2a however the resulting sectional magnetic encoding sections are paired and establish isolated domain boundaries with respect to each other as further detailed herein such as in FIG. 6.

Figure 3:
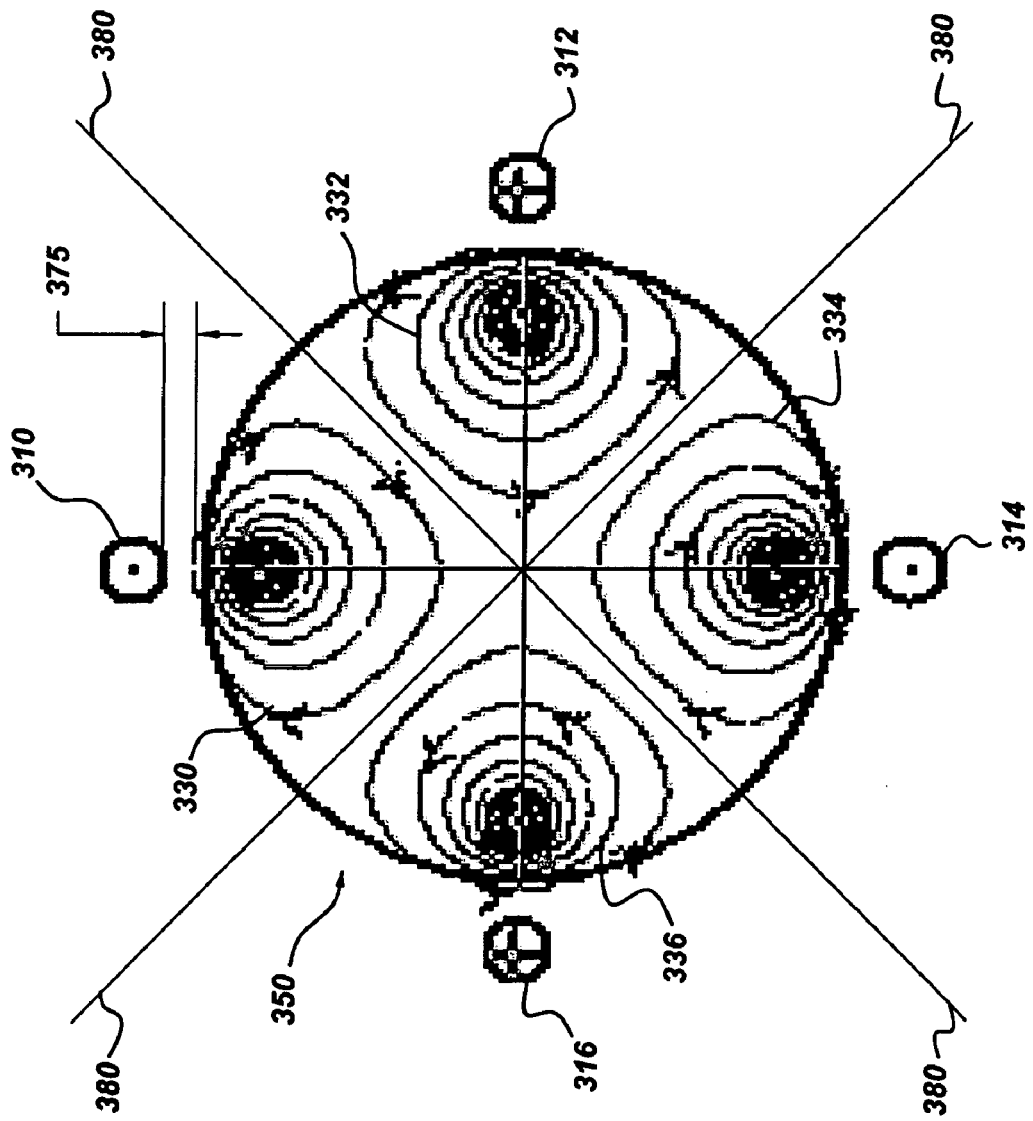
FIG. 3 is a cross sectional illustration of the magnetic flux density in the shaft associated with one embodiment.

Referring to FIG. 3, a cross sectional view of one example of an encoded shaft is depicted. According to one embodiment, the encoding involves conducting members proximate the shaft that apply encoding pulses and uses the return current flowing through the shaft to encode the shaft.

In this example, there are four conducting members 310, 312, 314, 316 that are spaced approximately 90 degrees about the shaft 350. The gap 375 between conducting members 310, 312, 314, 316 and the shaft 350 is typically small, as the closer the conducting member is to the shaft surface, the stronger the generated field or the less energy required. In one example the gap 375 is less than 1 mm and may include an isolating sheet (not shown) between the conducting member and the shaft surface. Tolerance is generally not problematic as this is only used during the encoding process and not during the shaft operation.

The conducting members 310, 312, 314, 316 illustrate the alternating opposing polarities used during the encoding process by an encoding source (not shown) such that there are positive polarity members 312, 316 and negative polarity members 310, 314. The encoding generates the sectional polarized magnetic regions 330, 332, 334, 336. For better illustration, the magnetic field lines shown in FIG. 3 belong to a magnetization with DC currents. When performing the magnetic encoding with DC current pulses, the skin effect prevents the magnetic field lines from penetrating the whole shaft cross section. Instead, they are concentrated near the shaft surface. The shorter the DC current pulse length, the higher the current and flux density near the shaft surface. This is advantageous for measuring torque based on magnetic field measurements because the highest magnetic flux densities are created close to the shaft surface, in only a few millimeters radial distance to the magnetic field sensors. One of the unique attributes of this encoding is the establishment of the magnetic polarized regions 330, 332, 334, 336 with domain boundaries 380. When torque is applied to the shaft, the greatest change in the magnetic flux density occurs at the domain boundaries 380.

Thus, the magnetic polarized regions 330, 332, 334, 336 show the magnetic fields are well-defined polarized magnetic regions respectively channels when encoded with short current pulses and define the domain boundaries 380 with respect to each other. The boundaries 380 tend to be the regions that demonstrate the highest magnetic flux densities measurable near the shaft surface when the shaft is subject to torsional movement. These domain boundaries 380 thus represent the optimal location for sensing.

Figure 4:
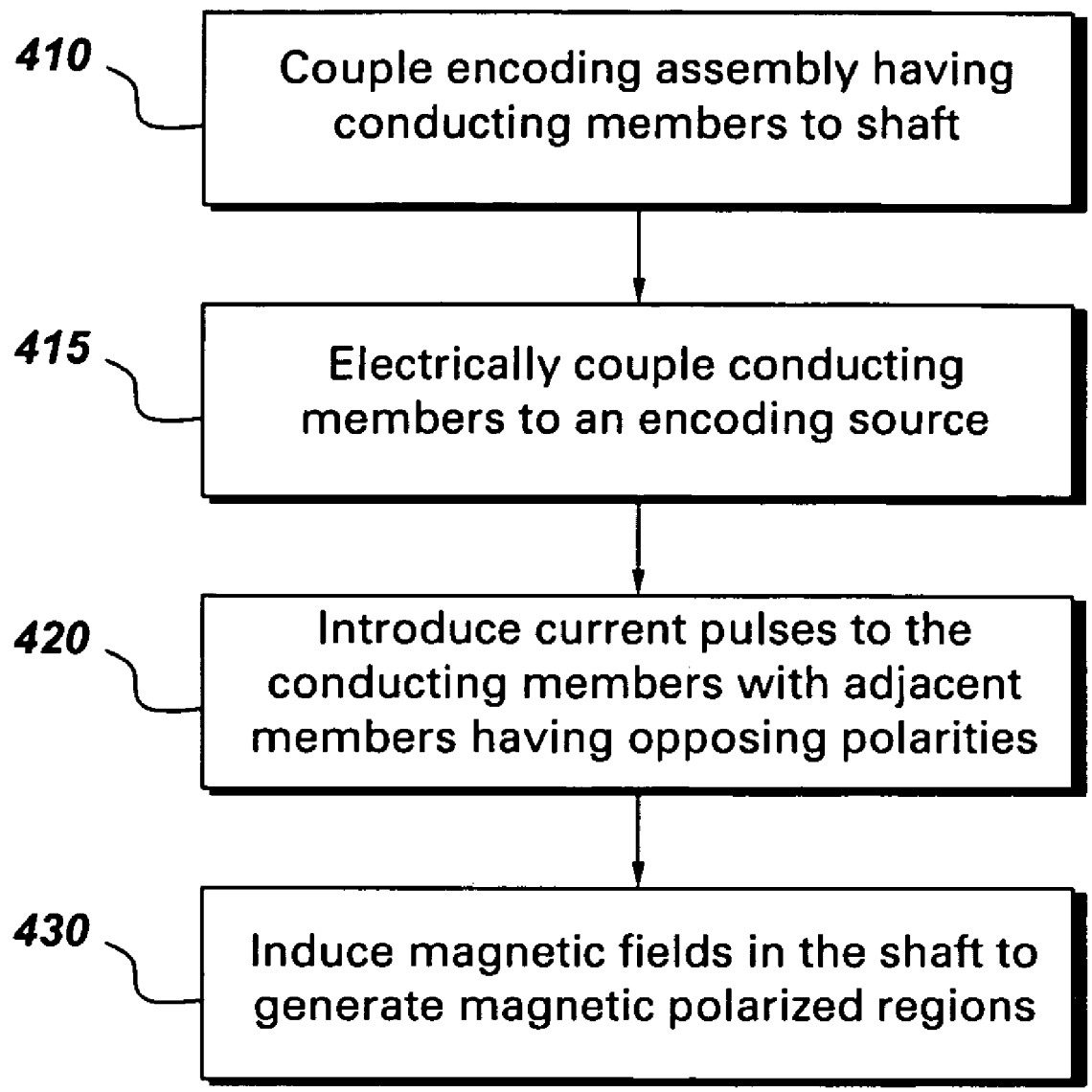
FIG. 4 is a flowchart for the encoding of magnetic sections configured in accordance with one embodiment.

Referring to FIG. 4, one embodiment for processing the encoded sections with magnetically polarized regions with domain boundaries is detailed. The shaft can be encoded during the manufacturing process, post manufacture, or post installation depending upon the requirements. As previously noted, the shaft should be of a ferromagnetic material or have a ferromagnetic material affixed to the shaft for the encoding.

Some form of encoding assembly is installed or positioned about the section of the shaft 410, wherein the assembly helps to maintain the conducting members in proper relation to each other and also to the shaft. The conducting members are typically arranged in a spatial relationship to each other and the assembly helps to maintain that relationship. The installed assembly can be of the various types including clamshell design and two-piece assembly such as known in the art. The positioned assembly can be a more integral housing that is positioned about a portion of the shaft.

In one embodiment the assembly has two or more degrees of freedom with respect to the conducting members and allows the conducting members to establish a spatial relationship to each other such as a phase spacing based on the shaft diameter.

There can be multiple assemblies coupled to the shaft during the encoding process or a single assembly that is used multiple times at different sectional locations along the shaft.

The conducting members are electrically coupled to an encoding source and also to the shaft 415. In one embodiment, electrodes couple the conducting members and encoding source with the shaft and electrical leads or jumpers can also be used to couple to provide electrical coupling. The electrodes can be placed approximately perpendicular proximate the end of the conductor member so that the electrodes are aligned roughly directly below the end of the conducting members.

The electrical connectivity can be done in a variety of ways depending upon the design criteria. For example, electrodes on one end of the conducting members can be connected to the encoding source by electrical jumpers or wire leads of sufficient thickness to accommodate the encoding signals. In one example, conducting members are coupled to the encoding source so that the alternating conducting members are coupled with alternating polarity.

The encoding source introduces current pulses to the conducting members 420. Typically more than one current pulse is applied to each conducting member, and several current pulses are typically applied. In one embodiment, the current pulses are applied sequentially to each of the conducting members. This can occur by applying the current pulses to each of the positive polarity conducting members first (with the corresponding electrodes coupled to the negative polarity) or by applying the current pulses sequentially to each conducting member and alternating the polarities as needed. One disadvantage of connecting conducting members in parallel is the reduced current amplitude in each conductor and difficulty in achieving equal current distribution among the paralleled conductors.

By way of example of a sequential encoding, a first current pulse is applied to the first conducting member and several current pulses with identical polarity are applied. As the cage is typically deployed about a stationary shaft, the location of the encoded segments is known. This makes it simple to apply encoding pulses to additional segments by rotating the shaft a fixed amount or rotating the assembly housing the conducting members a fixed amount.

In one embodiment the current pulse is generated by discharging a capacitor bank, wherein the pulse length of the current pulse can be modified by a discharge resistor. In one example, the fall time is approximately 10 ms. Alternatively, the duration of the current pulse can by adjusted by a switching device that can be switched from non-conducting state to the conducting state and after a certain time back to non-conducting state.

A short current pulse is typically utilized as higher frequencies decrease the depth penetration of the shaft. The current pulse in this example is a unipolar pulse and is sufficiently short to penetrate only the surface region and generate the same sectional magnetic polarized regions 330, 332, 334, 336 close to the shaft surface, as illustrated in FIG. 3 for a DC current encoding.

The depth of the current density is characterized by the skin depth δ which can be calculated according to the following relation:

$$\delta = \sqrt{\frac{1}{\pi \times f \times \mu_0 \times \mu_r \times \sigma}}$$

where $\sigma$—electrical conductivity of the shaft
$f$—frequency
$\mu_0$—permeability of the vacuum
$\mu_r$—relative permeability of the shaft material Assuming a current pulse generated by a capacitor discharge, where the rise time of the current is much smaller than the current decay time (fall time), the frequency in the above relation is related to the fall time of the current pulse applied during encoding. In general, the frequency in the above relation is related to the fundamental frequency (first harmonic) of the applied current pulse. Due to the high relative permeability of the ferromagnetic material being encoded, the skin depth gets relatively small even at moderate frequencies.

Regardless of how the current pulses are applied, the current pulses induce magnetic fields in the shaft 430 that generate magnetic polarized regions. It should be understood that the application of the current pulse can be simultaneous to all conducting members, sequentially to each member, or upon some grouping of members.

The magnetic shaft encoding according to one embodiment introduces regular magnetization patterns in circumferential direction that can be arranged at sufficient circumferential spacing. In this example, the magnetic field resulting from the rotating magnetized shaft is an AC field, and the frequency of the AC field is coupled to the rotational frequency of the shaft. Moderate frequencies enable the use of standard magnetic field sensors, such as Hall effect or fluxgate sensors for measuring the resulting magnetic field caused by the rotating shaft. In another embodiment high temperature resistant air core induction coils are used for field detection. A sufficiently high number of encoded sections can be implemented in the shaft, such that even at a high rotational speed a sufficiently high frequency signals are detectable.

In accordance with one embodiment, a simple encoding arrangement uses at least one isolated conductor attached proximate the shaft surface having a first end and a second end. There may be electrodes on the shaft near the input side and end of the conducting member in order to establish for the current flow and return paths.

A further embodiment uses four or more conducting members having alternating polarities disposed about at least one section of a shaft such that the alternating polarity of the conducting members is negative, positive, negative and positive and so forth. In a further embodiment the conducting members are paired and in close proximity to each other with alternate polarities, and there can be several paired conducting members about the shaft.

In one aspect, signals are transmitted on the conducting members such that a first set of encodings are instilled upon the section of the shaft. One additional aspect is that the first set of encodings is simultaneously encoded such that all channels are encoded at the same time. The conducting members can be supplied from different sources to avoid short circuits between return currents flowing in the shaft. In a further aspect the encodings are performed in one conducting member at a time.

An additional set of encodings can be disposed proximate a set of local flux density minimums located about the section of the shaft. The local minimums are disposed at locations offset from the first set of encodings, and centered between the conducting members with different polarities, as illustrated in FIG. 3.

By way of illustration, the encoding system can be implemented by a housing structure surrounding a section of the shaft. The housing typically contains a number of conducting members proximate the shaft but not in direct contact with the shaft. The conducting members can be isolated conductors oriented about the shaft having only the required number of members such as four or eight members for the first encoding and four or eight members for the second encoding. Alternatively, there can be additional members such that only some of the members are utilized depending upon the applications. Such an implementation provides redundancy and also permits a greater number of conductors for other applications.

In certain cases, the shaft diameter is a factor in determining whether the sequential encoding is acceptable as there should be sufficient separation between the encoding members so that the individual encoding does not disturb other encodings.

In one aspect the system creates a circumferentially changing magnetic field nearby the shaft, and as the shaft rotates this results in AC field components. The resulting AC field components are measurable by search coils. Such a system is insensitive to DC field disturbances and applicable to higher temperature ranges for other sensors such as flux gate sensors. In another aspect, involving large diameter shafts rotating at low or moderate speed, the magnetic field sensing can be performed by magnetic field sensors (MFS). Magnetic field sensors are generally used to measure the magnetic flux and/or the strength and direction of a magnetic field and can be based on several types of sensors including magnetoresistive devices, flux gate or coil sensors, Hall Effect sensors, magnetoinductive sensors. Selecting the specific magnetic field sensor depends upon the design criteria and includes certain aspects such as flux density, resolution, accuracy, and number of axes. With respect to the shaft, the sensors can be located to maximize the measured response, such that the sensors can be oriented for example at 0 degrees, 45 degrees and/or 90 degrees. Different types of sensors can be utilized to obtain various data from the shaft.

The sectional encoding can be performed in several ways including encoding only one or more shaft sections in a circumferential direction and multiple encodings in the circumferential direction in order to generate periodically alternating flux components so that inductive sensors can be used for sensing the magnetic flux density. Depending upon the intended application requirements, the multiple encodings allow for more data to be extracted during the rotation of the shaft that can provide more accurate and timely processing. By way of example, a coil with 400 turns, 1000Ω resistance and 0.9 $mm^2$ area has a noise level in the range of 2 $\mu T \times \sqrt{Hz}$ for a sinusoidal AC magnetic field. In the case of a rotating shaft with 1000 rpm and a measurement bandwidth of 50 Hz this results in a noise level of 0.8 $\mu T$. Therefore magnetic fields in the range of tens or hundreds of microteslas can be accurately measured by small air coils.

Figure 5:
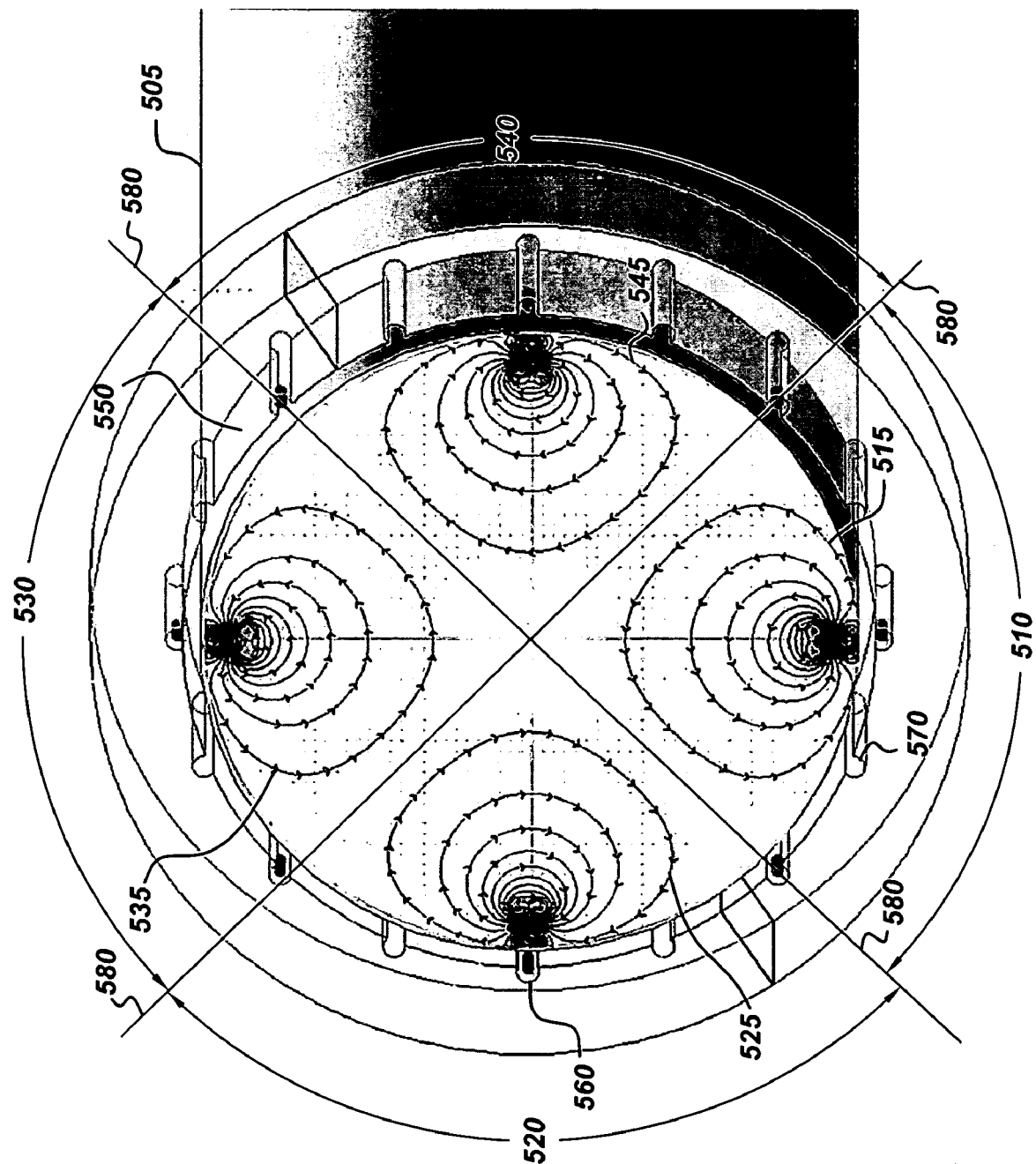
FIG. 5 shows a sensing system configured in accordance with one embodiment.

Referring to FIG. 5, another encoding embodiment is depicted. In this example, the magnetically polarized sections are formed at one or more sections about the shaft. Such an implementation is particularly useful for sectional magnetic encoding for large diameter shafts wherein encoding the entire circumference is extremely costly and time consuming.

The resulting field lines after the encoding process are shown in FIG. 5. In this example, there are four encoded sections 510, 520, 530, 540 each having respective magnetic fields 515, 525, 535, 545 proximate to the shaft skin with the magnetic flux density having properties based on the encoding. The penetration depth for the field lines depends on factors such as the length of the current pulses used in the encoding process. In one embodiment, well-defined domain boundaries 580 between encoded sections are established by encoding pulses with different polarities and lengths that are applied at each magnetically polarized section. Thus, domain boundaries 580 between magnetic polarized sections with different polarities can be created close to the shaft surface.

The orientation of the magnetic domain boundaries 580 helps to determine the optimum orientation of the magnetic field sensors 560 for measuring torque dependent field changes. The non-contact sensors 560 are positioned to detect the magnetic fields of the rotating shaft that can be processed to provide certain properties about the shaft.

The sensing frame assembly 550 can be a portion of the circumference of the shaft or disposed about the entire circumference. In certain embodiments, the sensors 560 are integrated into existing shaft housings such that a separate sensor assembly is not required and the integrated structure performs the functionality of the sensor assembly. The housing can provide a plurality of sensor slots 570 such that any number of sensors 560 can be deployed. One advantage of metallic housings is that it provides screening against external magnetic AC field components.

High power applications require reliable torque monitoring. According to one embodiment, the system deploys more sensing coils and therefore obtains greater frequency of readings and greater reliability. The sensing coils are relatively inexpensive and multiple coils can be easily deployed in a sensor holder. In one example, there are multiple sensors 560 disposed within the sensor assembly. According to one embodiment the plurality of sensors 560 are used to provide greater reliability by allowing more frequent measurements. The multiple sensors 560 can also be used to provide redundancy so that the sensing functions are operable even with some sensor failure. In another example, different types of sensors are deployed such that different types of data can be measured. The multiple sensor types can take advantage of the sensing properties of the particular sensor or otherwise allow for enhanced sensing functionality. In a further embodiment, the sectional encoding process includes different encoding sections having different encoding properties such that the sensors can obtain multiple forms of data.

By way of example, the use of four encoding sections as shown in FIG. 3 can be used for shafts such as 60 mm. For larger diameter shafts or for more precise measurements, additional encodings can be employed to add further magnetic polarization regions and corresponding boundaries. To minimize the time effort and cost for the magnetic encoding of large shafts in applications where no high sampling rate for the torque is required, the shaft can be only partially magnetized in circumferential direction, such as illustrated in FIG. 6.

Generation of the magnetically encoded polarized regions and neutral zones therebetween enables generation of a torque dependent AC field component in the surroundings of a rotating shaft, so that the shaft power can be measured directly by measuring the induced voltage in a coil placed nearby the shaft.

Direct measurement of the shaft power (or speed and torque) using induced voltage in a search coil can be applied at temperatures of more than 500° C. and is only limited by the coil material properties. The system is also not sensitive to constant magnetic fields originating from the surrounding as only AC field components are measured.

Figure 6:
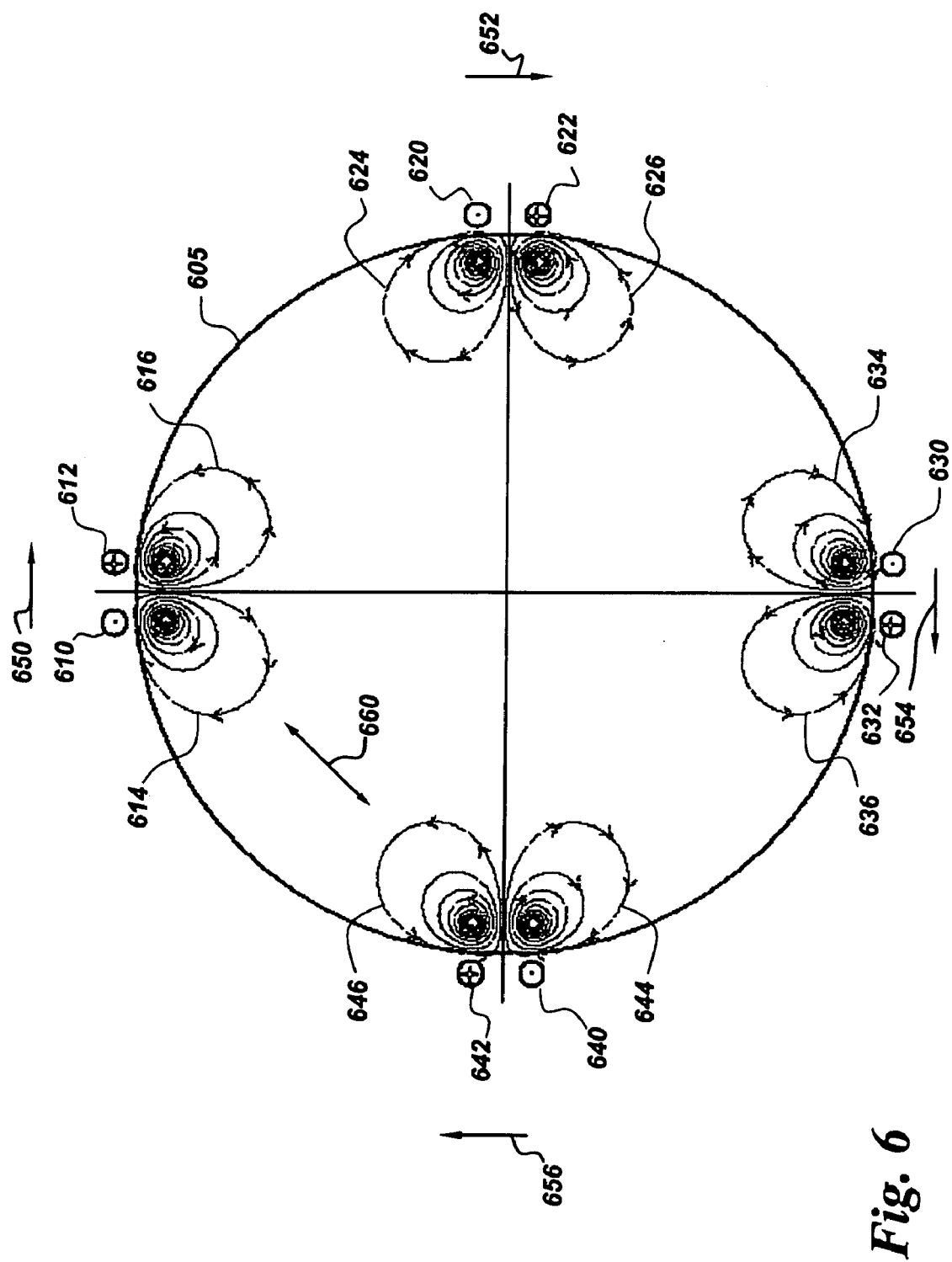
FIG. 6 illustrates encoding of a shaft to generate magnetically polarized regions along sections of a shaft and the orientation of the magnetic field sensors according to one embodiment

Referring to FIG. 6, one embodiment for sectional magnetic encoding is depicted. In this example pairs of conducting members 610, 612; 620, 622; 630, 632; and 640, 642 are located about the shaft 605. Each pair is used to create magnetically polarized regions with domain boundaries for the paired conducting members of the corresponding magnetic fields 614, 616; 624, 626; 634, 636; and 644, 646. Each pair of conducting members 610, 612; 620, 622; 630, 632; 640, 642 can be coupled to an encoding source (not shown) that provides different polarities to the members in each pair in order to generate the alternating polarized magnetic fields.

For example, the conducting member 612 employs a positive polarity encoding while the paired conducting member 610 uses a negative polarity encoding. The polarized magnetic regions 616, 614 resulting from the encoding have a domain boundary region 650 that represents the location of optimal response from torsional movement of the shaft 605. Unlike the domain boundaries of FIG. 3, the paired polarized magnetic regions are far apart and there is a void space 660 between each respective region.

In the illustrated example of FIG. 6, there are eight encoded regions 614, 616; 624, 626; 634, 636; and 644, 646 on the shaft 605 generated by the four pairs of conducting members 610, 612; 620, 622; 630, 632; 640, 642. Thus, well-defined magnetic polarized regions with four magnetic domain boundaries 650, 652, 654, 656 can be achieved without having to magnetize the whole shaft. The magnetic field sensors used in this example can be oriented in a circumferential direction to measure magnetic field components that are tangential to the shaft surface and perpendicular to the magnetic domain boundaries. This is the optimum orientation for the magnetic field sensors under ideal conditions. If the field sensors are installed in proximity to the locations where the encoding tool electrically contacted the shaft surface, other orientations of the magnetic field sensors may be favorable.

Figure 7:
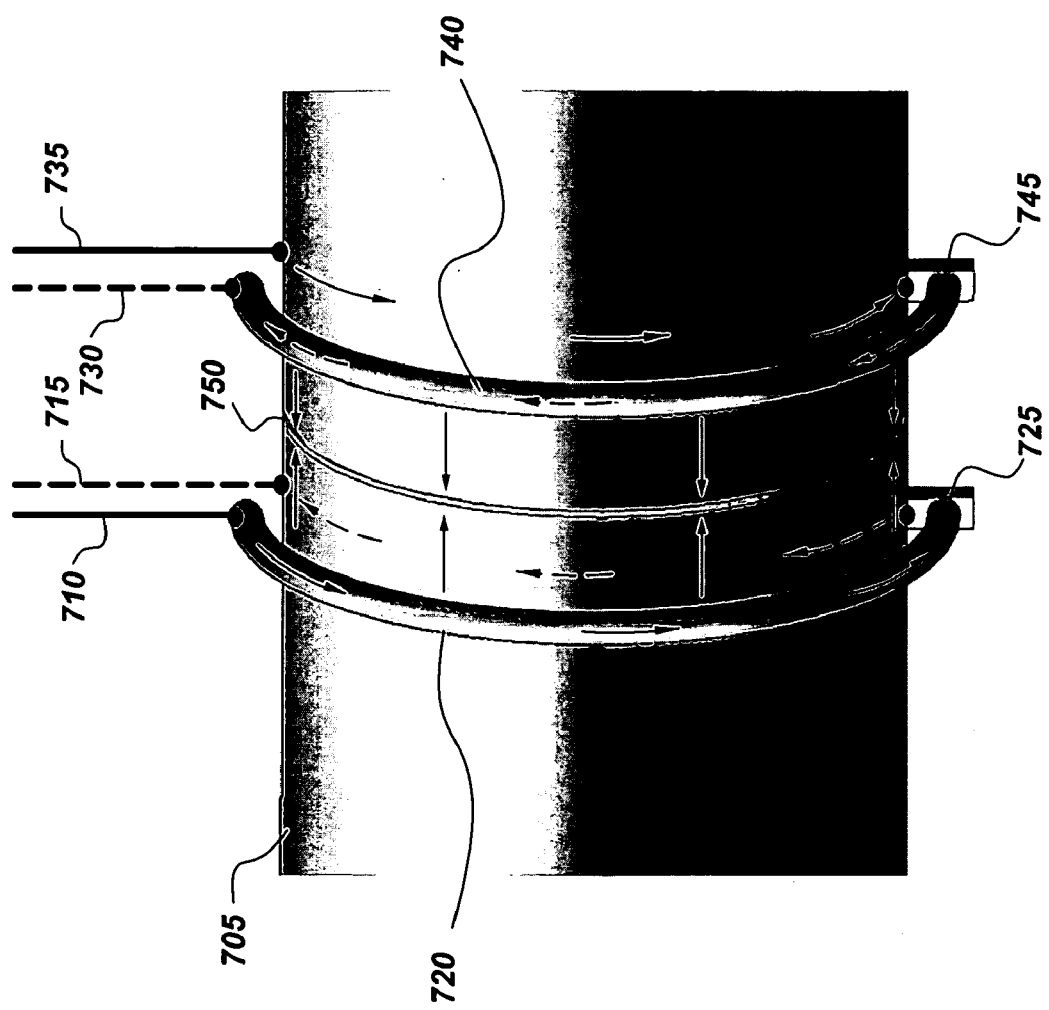
FIG. 7 shows encoding of a shaft along the circular circumference according to another embodiment.

Referring to FIG. 7, a further embodiment of encoding is depicted for magnetically encoding and creating magnetic domain boundaries on the shaft along the radial circumference of the shaft 705. In this example, there are arc segments 720, 740 positioned about a segment of the shaft 705. One conducting arc segment 720 is coupled to a positive polarity encoding source (not shown) on a positive end 710 such that the encoding currents travel along from the positive end and along the arc 720. In this example, the other end of the conducting arc segment 720 is coupled to the shaft 705 by an electrode 725 in contact with the shaft 705. The encoding current pulse thus travels along the conducting member 720 with the return currents traveling along the shaft 705 to the return electrode at the return end 715 that is electrically coupled to the encoding source (not shown).

The other conducting arc segment 740 is coupled on a return end 730 to the encoding source (not shown). The encoding signals travel from the encoding source (not shown) to the positive end 735 via an electrode in contact with the shaft 705 along the surface of the shaft and through the electrode 745. The encoding currents travel along the arc segment 740 and return via the return end 730 to the encoding source (not shown). Once again, this encoding generates sectional magnetic regions about the circumference of the shaft 705. The combination of the pair of conducting arc segments 720, 740 that create the polarized magnetic regions also creates the domain boundary 750 therebetween that is the optimal sensing region.

In this example, there are two polarized regions orientated in an axial direction to the shaft. The magnetic field measurement is simpler than other embodiments because the shaft rotates radially and there is a greater length of sensing area in the circumferential direction.

It should be readily apparent that while depicted as an arc segment of about a semi-circle, the arc segments can be a small portion of the shaft or larger portions of the circular circumference. Furthermore, while shown as being circumferential, the encoded channels can be along any direction of the shaft such as diagonal for the magnetic polarized channels.

Figure 8:
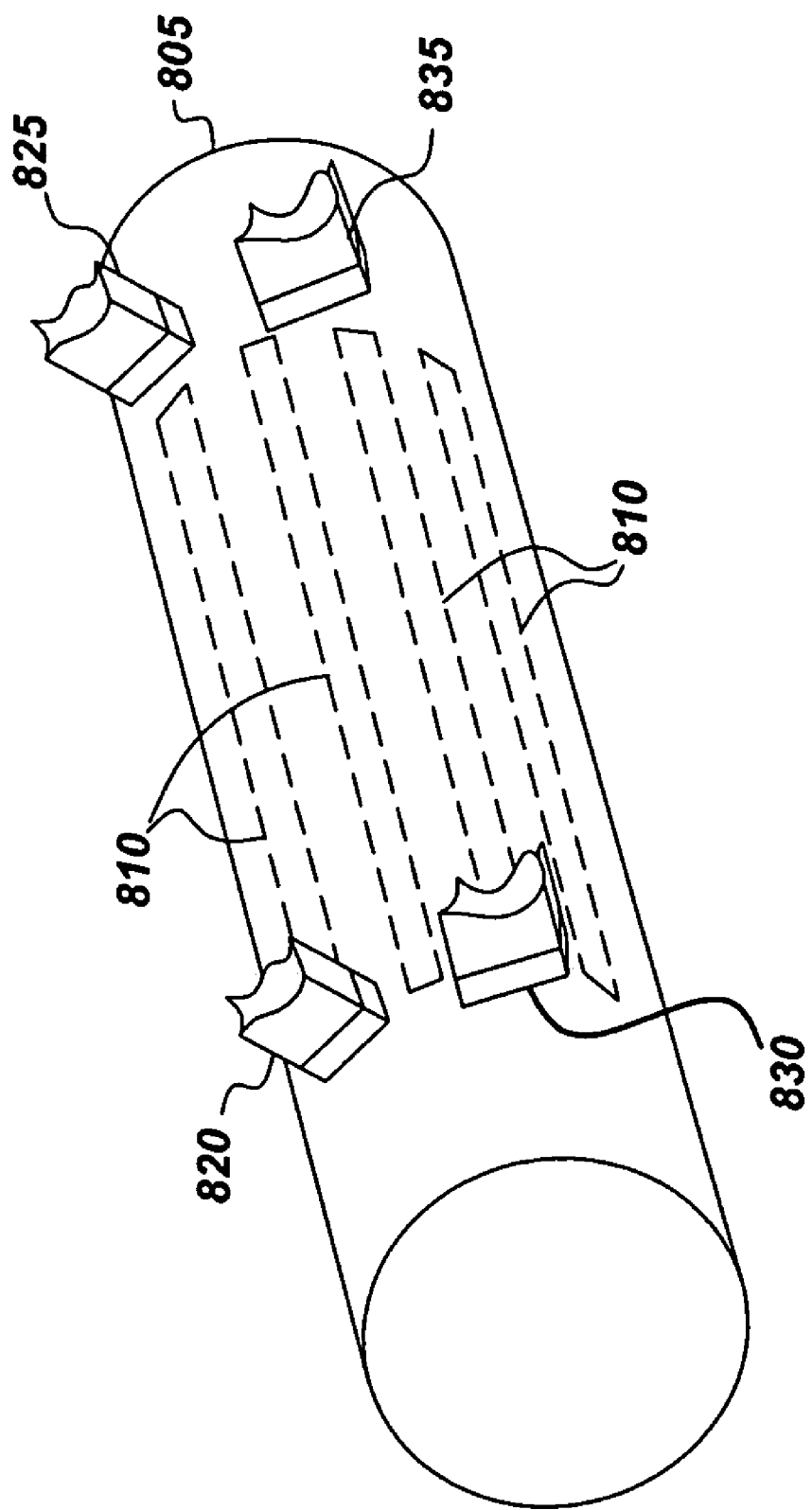
FIG. 8 shows one measurement system according to one embodiment.

Referring to FIG. 8, one embodiment of a simplified measurement system is depicted. In this example, the magnetically encoded shaft 805 includes a plurality of polarized magnetized regions 810 with magnetic domain boundaries therebetween caused by encoding pulses with alternating polarities in each of these sections. The number of magnetically encoded polarized regions depends upon the encoding and the design criteria, such as the diameter of the shaft. It should be appreciated that the shape of the polarized magnetic channels are shown as being linear for convenience. In this example, sensors 820, 825, 830, 835 are used to measure aspects of the rotating shaft during operation.

Referring again to FIG. 8, when the shaft 805 is not subject to torque or bending, the magnetic flux paths mainly close within the shaft material. Upon the application of some torque or bending moments of the shaft 805, discontinuities of flux components at the magnetic domain boundaries create an additional magnetic field in space (outside the shaft material) that is measurable by one or more of the sensors 820, 825, 830, 835.

In this example, sensor units 820, 825, 830, 835 reside at some small distance from the shaft 805 and are oriented to detect the magnetic fields. The sensor 820, 825, 830, 835 can be the same or similar type sensors and oriented in the same or similar plane with respect to the shaft. In another embodiment, the sensors are oriented in different manners such as different angles to be able to detect different measurements. While in yet another embodiment, the sensors 820, 825, 830, 835 are of varying types configured to detect different properties. The measured data is typically subject to subsequent processing to determine the characteristics associated with the shaft based on the measured magnetic field.

High temperature operation of the conventional magnetostrictive sensor systems is limited by the sensors that have to be capable of sensing DC magnetic fields. In the case of flux gate sensors, for example, high temperature operation is limited by the Curie temperature of the core material used in the fluxgate sensor. Sectional magnetic encoding provides the ability to measure induced currents due to the AC magnetic field caused by the rotating sections of the shaft. In one example, the sensor is a sensor coil with an air-core. However, other sensors are possible including fluxgate, Hall effect, anisotropic magnetostrictive, and giant magneto-resistive (GMR).

In one embodiment, it is desirable that the sensor operate in pairs 820, 825 and 830, 835 and work in a differential mode of operation, since this makes them more robust against common mode types of disturbances, such as the ambient temperature or external magnetic fields and provides symmetrical responses to torques of opposite directions. In one example, the first sensor pair 820, 825 is oriented with respect to the shaft at a different angle that the second sensor pair 830, 835.

One embodiment of the system provides a magnetic encoding system and method for magnetostrictive measurements. In contrast to conventional schemes, the shaft has magnetic polarized regions encoded to generate alternating flux components so that inductive sensors can be used for sensing the magnetic flux density that is directly proportional to the applied torque.

In certain applications, when applying sectional magnetic encoding, it is difficult to accurately achieve the same flux distribution and/or magnetization in all shaft sections. There are several causes for the lack of consistency between sections, such as the magnetic encoding tools applied subsequently to different sections, material inhomogeneities, and differing magnetizing current densities applied to the shaft sections. This is particularly relevant when the magnetizing tools cannot be connected simultaneously and in series with the sections. Due to the differences in the magnetic properties between the encoded channels, sensing the same torque or power with identical sensors over different magnetically encoded shaft sections might lead to inaccurate results.

Figure 9:
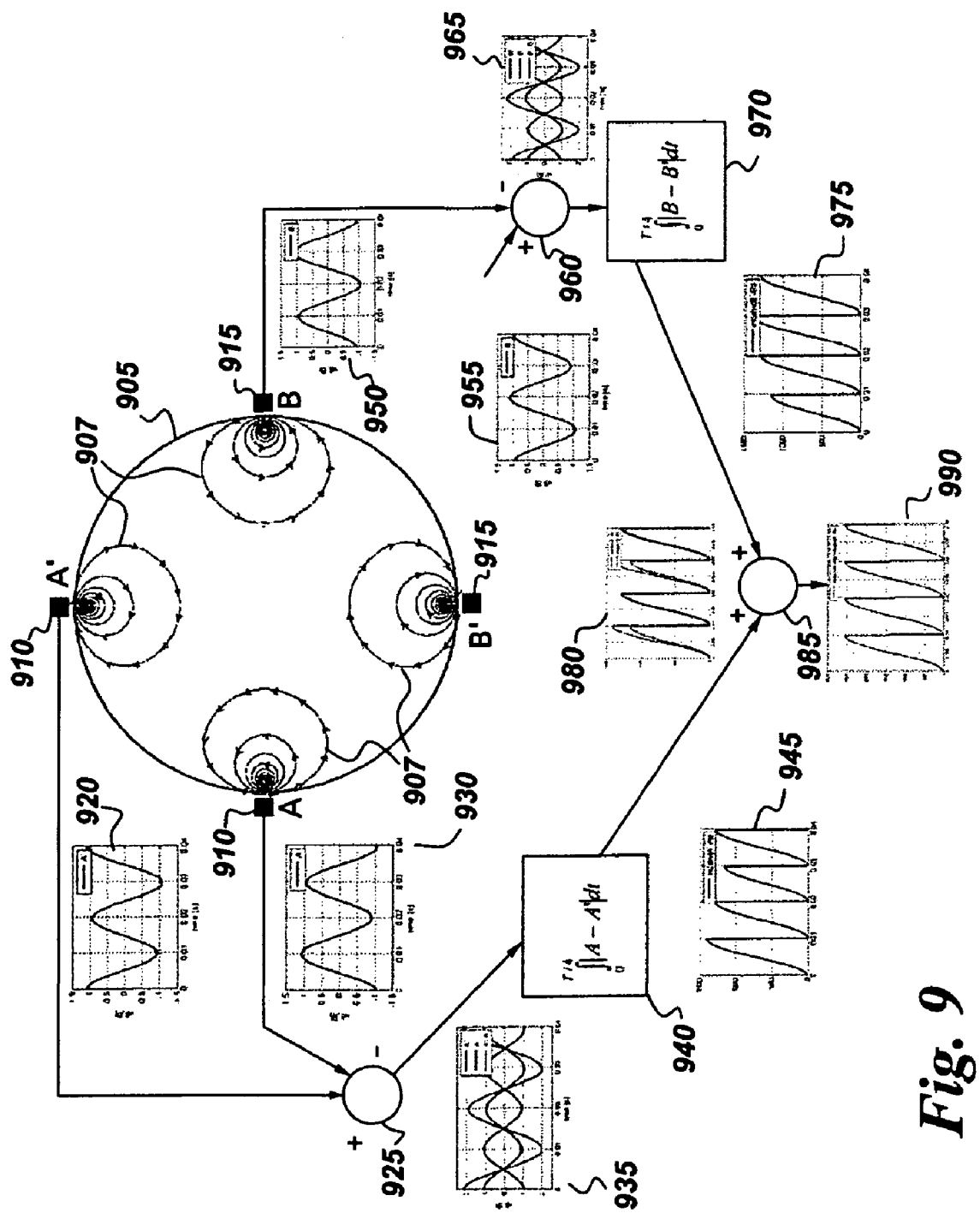
FIG. 9 is an integral sensing system for sectional encoded shafts according to one embodiment.

Therefore, the magnetic field sensing in one embodiment is based on a method and system where the measurement values are based on an integration method. The integration typically involves several factors for the integration processing. The integration typically includes at least one full revolution of the shaft In FIG. 9, one measurement system example is provided for illustrative purposes to explain the operations, wherein the encoded shaft 905 has a number of polarized magnetic regions 907 on the shaft. A first pair of sensors 910 labeled A and A' are disposed proximate the shaft 905 with a small gap therebetween. The sensors 910 measure the properties of the shaft based on the measured changes to the magnetic fields 907. As one example to illustrate the processing, the sensors A and A' are orientated to measure the tangential magnetic field components perpendicular to the axis of the shaft. For better understanding, it is assumed that the sensors measure ideal sine wave signals as the shaft rotates. The sensor A' receives the sinusoidal signal 920 that is combined with the signal 930 from sensor A in the subtractor 925 to produce the resulting signal 935. This signal 935 is integrated by the integrator 940 producing the first integral signal 945.

The second pair of sensors 915 labeled B and B' are also disposed proximate the shaft 905 with a small gap therebetween. The sensors 915 also measure the properties of the shaft based on the measured changes to the magnetic fields 907. The sensor B receives the sinusoidal signal 950 that is combined with the signal 955 from sensor B' in the subtractor 960 to produce the resulting signal 965. This signal 965 is integrated by the integrator 970 producing the second integral signal 975. The first integral signal 945 is combined with the second integral signal 975 in the combined signal 980 at the summer 985 to produce the combined output signals 990.

In one embodiment, there are eight encoded sections and eight induction coils, wherein eight measurement values are achieved during one revolution. For example, one new sample is taken every 2.5 ms for shafts rotating at 3000 rpm, which is typically sufficient for most high power applications such as large shafts. If this sampling rate is not sufficient, the number of encoded sections or the number of sensing coils can be increased.

In cases where a higher sampling rate of the measured torque is required, more advanced signal processing algorithms can be utilized enabling a realtime output of the measurement signal without integration.

Figure 10B:
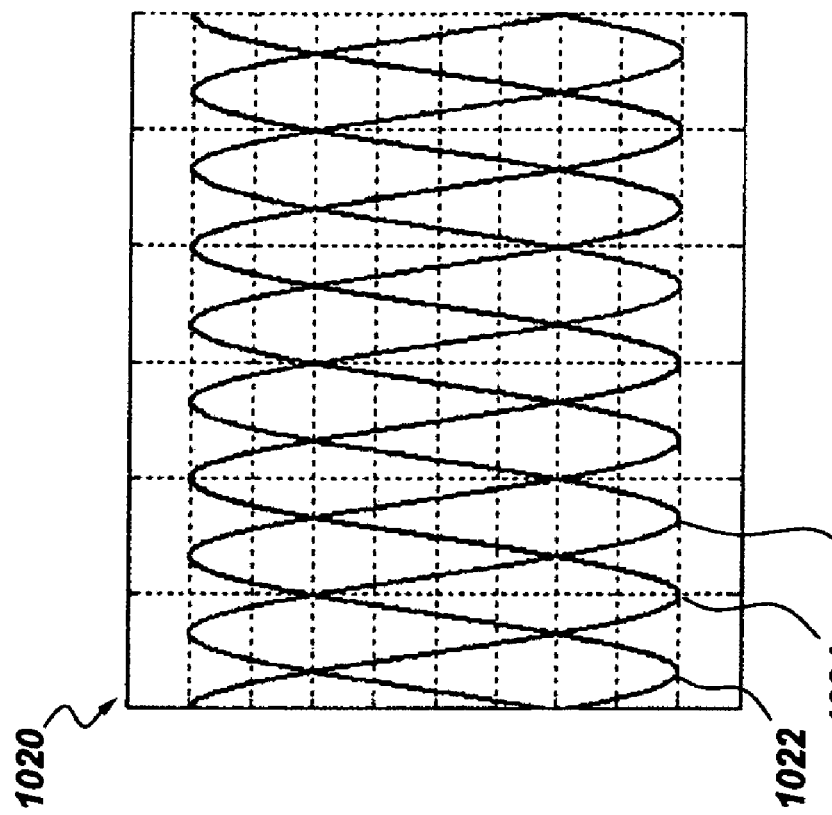
Figure 10A:
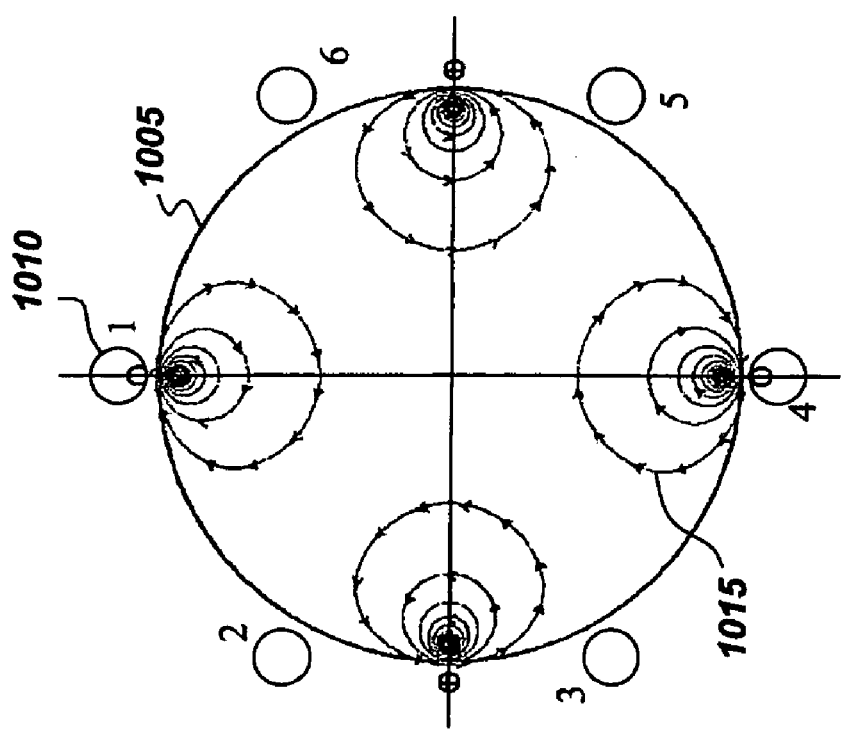

Referring to FIG. 10a-10f, a sensing embodiment with advanced signal processing for a sectional encoded shaft 1005 is detailed and includes two measuring scenarios, namely ramp torque changes (FIG. 10 c-d) and step-function torque changes (FIG. 10 e-f). This embodiment can be used for higher sampling rates of the measured torque using sine functions, wherein the sine functions are typically employed on the encoding and decoding. The higher sampling rate enables a realtime output of the measurement signal since no integration is needed.

Referring to FIG. 10a and 10b, there are four encoded sections 1015 having respective domain boundaries and six sensor units 1010. The respective outputs of two of the sensors 1010 that are 180° apart are coupled in series at the receiving coils. The three resulting outputs are then combined to form a three phase signal 1020 and in one example phase one 1022 consists of the output from sensors 1 and 4; phase two 1024 includes the output from sensors 3 and 6; and the last phase 1026 includes sensor outputs 5 and 2. At some time the shaft is subject to some torque and the measurements are processed.

FIGS. 10c and 10d graphically illustrate the processing for a ramp function for the torque change that undergoes dq transformation. The ramp function 1030 includes phase 'a' 1032, phase 'b' 1034 and phase 'c' 1036 and shows how the output ramps downward in a linear fashion over time. The dq transformation output 1040 shows the d output 1042 and the q output 1044.

FIGS. 10e and 10f graphically illustrate the processing for a step function for the torque change that undergoes the dq transformation. The step function graph 1050 shows phase 'a' 1052, phase 'b' 1054 and phase 'c' 1056 and includes the difference between the outputs 1058 as a result of some shaft changes.

The transformed output is graphically depicted 1060 showing the d output 1062 and the q output 1064 wherein the torque is represented as the change in levels 1066.

In one embodiment there is a dq0 transformation of the sensed signals as follows:

$$V_d = \frac{2}{3}(V_a\sin(\omega t) + V_b\sin(\omega t - 2\pi/3) + V_c\sin(\omega t + 2\pi/3))$$

$$V_q = \frac{2}{3}(V_a\cos(\omega t) + V_b\cos(\omega t - 2\pi/3) + V_c\cos(\omega t + 2\pi/3))$$

$$V_0 = \frac{1}{3}(V_a + V_b + V_c)$$

The encoding method and system according to one embodiment enables highly accurate measurements of direct power, torque, and/or bending moment for rotating machinery. Depending on the number of sensing coils and the sensing coil processing, the electrical signal is directly proportional to the shaft power, torque or bending moments. Ease of sensor integration is yet another feature of this system achieved by the use of small coils. It is also possible to locate the sensor electronics at some distance from the sensors and up to several meters away from the sensor installation to enable measurement in harsh environments.

One of the features of the system detailed herein is the non-contact measurement of shaft power, torque and/or speed based on sensing AC field components with respect to the shaft. High sampling rates can simply be achieved in shafts rotating at high speed, for example, high-speed electrical machines or jet engines. The measurement of shaft power, torque, and speed can be based on air-core induction coils which are smaller, low cost and enables operation in environments involving temperature ranges above 220 deg C.

This system also provides a non-contact measurement system as nothing is attached to the rotating shaft during operation. This non-contact system enables direct monitoring of the shaft power that is extremely relevant for detecting efficiency decreases in different sections of a shaft system such as large turbine trains.

One application example that might benefit from the measurement system detailed herein relates to a drive train of a wind turbine. The frame with the magnetizing members can be installed during the manufacturing process quickly, thereby satisfying the magnetic encoding requirements for the main shaft. High interest in a wind turbine main shaft is the monitoring of bending moments and the reduction of such moments in applying asymmetrical load control (ALC), based on the bending moment measurement. An example design for a magnetic encoding enabling bending moment measurements is for the large diameter shaft of a wind turbine. If a torque is applied to this shaft, all sensors measure the same magnetic field change. In case of bending moments in vertical or horizontal direction, the two opposite field sensors measure different field changes. In one example, sensor pairs are applied at the four sensor locations to enable differential measurement. The accuracy and reliability of the sensing system can be increased in adding more sensor pairs in circumferential direction.

Since wind turbine main shafts are rotating slowly and typically have slip rings enabling to easily extract signals from the rotating shaft, it would be possible to install the magnetic field sensors directly on the shaft surface, in proximity to the magnetic domain boundaries, such that the sensor system would be rotating with the main shaft, enabling very accurate torque and bending moment output signals because the sensors produce the same magnetic field output at all rotor positions. Thus, such secondary sensors can be permanently installed in the main drive shaft with the magnetic field or bending moment signals transmitted via existing slip rings or wireless communications.

Shaft power measurements with high resolution and repeatability also enable to detect vibrations or technical issues in the rotor shaft system at an early stage, for an advanced maintenance planning or for fatigue diagnostics. High accuracy monitoring of the shaft power under all operating conditions and over the lifetime of a shaft system enables to achieve higher turbine or jet engine efficiency.

The ability to accurately measure shaft torque inbetween individual stages of steam and gas turbines or compressors is an important tool for measuring and optimizing the performance. In conventional turbine and compressor applications there is no direct shaft torque or power measurement available between individual stages after commissioning of the system.

Torque sensing systems based on permanent magnetic encoded steel sections enable to measure the shaft power output and bending at different shaft sections with high long term stability. This is of high relevance for wind turbines, but also for steam turbines, gas turbines or large compressors where small decreases in the power output between individual turbine stages can easily be detected, enabling to perform preventive maintenance and keep the energy efficiency high at all times during the lifetime of a turbine or compressor.

Another aspect relates to the inclusion of multiple sensing coils for redundancy. The low costs of the sensing elements enable practical use of multiple sensing coils such that the measurement system is operational even if one or more individual sensor elements fail.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A magnetic encoding system of a shaft, comprising:
   at least one conducting member having a first end and a second end which is disposed proximate said shaft with a gap between said member and said shaft;
   a pair of electrodes proximate each end of said conducting member and electrically coupled to said shaft, wherein one of said electrodes is electrically coupled to said second end of the conductor member; and
   an encoding source electrically coupled to said first end of the conducting member and electrically coupled to the other of said electrodes;
   wherein unipolar current pulses from said encoding source are applied to said electrodes and said conducting member, thereby creating sectional encoded regions in the shaft.

2. The system according to claim 1, further comprising a non-conductive encoding assembly disposed about at least a section of said shaft, wherein said conducting member is disposed within said encoding assembly.

3. The system according to claim 1, wherein said conducting member is oriented axially along a section of said shaft.

4. The system according to claim 1, wherein said conducting member is oriented circumferentially along a section of said shaft.

5. The system according to claim 1, wherein said conducting member is oriented diagonally along a section of said shaft.

6. The system according to claim 1, wherein said electrodes are temporarily coupled to said shaft.

7. The system according to claim 1, wherein at least two of said conducting members are positioned adjacent to each other about said shaft for creating sectional encoded regions of opposing polarities.

8. The system according to claim 7, further comprising magnetic domain boundaries formed between said adjacent sectional encoded regions.

9. The system according to claim 8, wherein said adjacent conducting members are positioned in close proximity to each other.

10. The system according to claim 1, said at least one conducting member comprises a plurality of conducting members oriented about at least a section of said shaft.

11. The system according to claim 1, wherein said shaft is made of a ferromagnetic material.

12. The system according to claim 11, wherein said ferromagnetic material is steel.

13. The system according to claim 1, wherein said shaft has a layer of ferromagnetic material applied about a surface of said shaft.

14. The system according to claim 1, wherein said conducting members are substantially linear or circular and extend longitudinally or circumferentially along a section of said shaft.

15. A method for encoding a shaft, comprising:
   disposing at least one conducting member in close proximity about a section of said shaft, said conducting member having a first end and a second end;
   disposing electrodes onto said shaft proximate the first end and the second end, wherein said second end electrode is coupled to said second end of said conducting member;
   electrically coupling said first end electrode to a current source and coupling said current source to said first end of said conducting member; and
   applying unipolar current pulses to said conducting members thereby inducing sectional encoding regions.

16. The method according to claim 15, wherein at least two of said conducting members are oriented adjacent to each other, wherein said encoding is with opposing polarities such that the resulting polarized magnetic channels have domain boundaries.

* * * * *